(12) United States Patent
Tanaka et al.

(10) Patent No.: US 12,514,388 B2
(45) Date of Patent: Jan. 6, 2026

(54) DISH COLLECTING APPARATUS

(71) Applicant: Kura Sushi, Inc., Osaka (JP)

(72) Inventors: Kunihiko Tanaka, Osaka (JP); Kenji Ogoshi, Osaka (JP)

(73) Assignee: KURA SUSHI, INC., Osaka (JP)

( * ) Notice: Subject to any disclaimer, the term of this patent is extended or adjusted under 35 U.S.C. 154(b) by 577 days.

(21) Appl. No.: 17/926,899

(22) PCT Filed: May 19, 2021

(86) PCT No.: PCT/JP2021/018904
§ 371 (c)(1),
(2) Date: Nov. 21, 2022

(87) PCT Pub. No.: WO2021/246166
PCT Pub. Date: Dec. 9, 2021

(65) Prior Publication Data
US 2023/0276958 A1 Sep. 7, 2023

(30) Foreign Application Priority Data
Jun. 1, 2020 (JP) .................. 2020-095714

(51) Int. Cl.
*B07C 5/342* (2006.01)
*A47F 10/06* (2006.01)
*B65G 1/02* (2006.01)

(52) U.S. Cl.
CPC .............. *A47F 10/06* (2013.01); *B65G 1/02* (2013.01); *B65G 2203/0241* (2013.01)

(58) Field of Classification Search
CPC ... A47F 10/06; B65G 1/02; B65G 2203/0241; G07F 13/10; G07F 17/0064; A47G 23/08; B07C 5/342
See application file for complete search history.

(56) References Cited

FOREIGN PATENT DOCUMENTS

| JP | 60-5271 A | 1/1985 |
|----|-----------|--------|
| JP | S62-150972 U1 | 9/1987 |
| JP | H07-262 A | 1/1995 |
| JP | 11-104575 A | 4/1999 |

(Continued)

OTHER PUBLICATIONS

International Search Report issued in corresponding International Application No. PCT/JP2021/018904 dated Aug. 3, 2021, w/ English Translation (6 pages).

*Primary Examiner* — Justin Holmes
(74) *Attorney, Agent, or Firm* — Rimon P.C.

(57) ABSTRACT

In order to solve a problem in conventional dish collecting apparatuses that it is not possible for conventional plate collecting apparatuses to determine and collect multiple types of dishes with different shapes, a dish collecting apparatus for causing a dish that passes through a collecting slot to be collected in a dish collecting portion in restaurants includes: a determining part that determines whether a first-type dish has passed through the collecting slot or a second-type dish whose shape is different from that of the first-type dish has passed through the collecting slot; and a processing unit that performs predetermined processing according to a determination result of the determining part. Accordingly, it is possible to determine multiple types of dishes with different shapes that pass through the collecting slot.

7 Claims, 15 Drawing Sheets

(56) References Cited

FOREIGN PATENT DOCUMENTS

| | | | | |
|---|---|---|---|---|
| JP | H11104575 | A | * | 4/1999 |
| JP | 3859962 | B2 | | 12/2006 |
| JP | 2010-221143 | A | | 10/2010 |
| SG | 10201510562 | R | * | 7/2017 |
| WO | WO-2018034251 | A1 | * | 2/2018 ............. A47L 15/00 |

* cited by examiner

| Dish type | | First sensor | Second sensor | Third sensor | Processing unit |
|---|---|---|---|---|---|
|  | Dish | Detected | Not detected | Detected | Count first-type dishes |
|  | Tea mug | Detected | Detected | Detected | Count second-type dishes |
|  | Small bowl | Detected | Detected | Detected | Count second-type dishes |
|  | *Udon* bowl | Detected | Detected | Detected | Count second-type dishes |
|  | Two-plate attachment | Detected | Not detected | Not detected | Count second-type dishes |

Fig. 10

| Dish type | | First sensor | Second sensor | Third sensor | Post-processing |
|---|---|---|---|---|---|
|  | Dish | Detected | Not detected | Detected | Count plates |
|  | Tea mug | Not detected | Detected | Detected | Recognize as "not plate" |
|  | Small bowl | Not detected | Detected | Detected | Recognize as "not plate" |
|  | *Udon* bowl | Not detected | Detected | Detected | Recognize as "not plate" |
|  | Attachment | Detected | Not detected | Not detected | Recognize as "not plate" |

Fig. 13

DISH COLLECTING APPARATUS

CROSS REFERENCE TO RELATED APPLICATIONS

This application is the U.S. National Phase under 35 U.S.C. § 371 of International Application No. PCT/JP2021/018904, filed on May 19, 2021, which in turn claims the benefit of Japanese Application No. 2020-095714, filed on Jun. 1, 2020, the entire contents of each are hereby incorporated by reference.

TECHNICAL FIELD

The present invention relates to a dish collecting apparatus that can be used to collect dishes in restaurants.

BACKGROUND ART

Conventionally, restaurant stores and the like are known in which food and drink such as sushi placed on food/drink placement plates are conveyed by a conveyor that is circulated along tables, and users pick up food and drink together with food/drink placement plates conveyed by the conveyor and can consume the food and drink placed on the plates. Some of the stores and the like have used plate collecting apparatuses for collecting food/drink placement plates from tables. Furthermore, such plate collecting apparatuses have been used to calculate the amount billed to users, by setting a standard price for a food/drink placement plate in advance, and counting the number of food/drink placement plates on which food and drink consumed by the users were placed at the time of billing (see Patent Document 1, for example).

CITATION LIST

Patent Document

Patent Document 1: Japanese Patent No. 3859962

SUMMARY OF INVENTION

Technical Problem

Incidentally, conventional plate collecting apparatuses are problematic in that it is not possible to determine and collect multiple types of dishes with different shapes.

Solution to Problem

A first aspect of the present invention is directed to a dish collecting apparatus for causing a dish that passes through a collecting slot to be collected in a dish collecting portion in a restaurant, including: a determining part that determines whether a first-type dish has passed through the collecting slot or a second-type dish whose shape is different from that of the first-type dish has passed through the collecting slot; and a processing unit that performs predetermined processing according to a determination result of the determining part.

With this configuration, it is possible to determine multiple types of dishes with different shapes that pass through the collecting slot.

Furthermore, a second aspect of the present invention is directed to the dish collecting apparatus according to the first aspect, wherein the determining part has at least two sensors that each detect an object that passes through a predetermined detection range in the collecting slot, and at least two sensors out of the sensors have detection ranges at different heights.

With this configuration, it is possible to determine multiple types of dishes with different heights.

Furthermore, a third aspect of the present invention is directed to the dish collecting apparatus according to the first aspect, wherein the determining part has at least two sensors that each detect an object that passes through a predetermined detection range in the collecting slot, and at least two sensors out of the sensors have detection ranges at different positions in a width direction.

With this configuration, it is possible to determine multiple types of dishes with different widths.

Furthermore, a fourth aspect of the present invention is directed to the dish collecting apparatus according to any one of the first to third aspects, wherein the determining part has at least three sensors that each detect an object that passes through a predetermined detection range in the collecting slot, and determines whether the first-type dish has passed through the collecting slot or the second-type dish has passed through the collecting slot, based on a combination of detection results of at least three sensors out of the sensors.

With this configuration, it is possible to precisely determine multiple types of dishes.

Furthermore, a fifth aspect of the present invention is directed to the dish collecting apparatus according to the fourth aspect, wherein the determining part determines whether the first-type dish has passed through the collecting slot, the second-type dish has passed through the collecting slot, or a third-type dish whose shape is different from those of the first-type dish and the second-type dish has passed through the collecting slot, based on a combination of detection results of the three sensors.

With this configuration, it is possible to determine three types of dishes.

Furthermore, a sixth aspect of the present invention is directed to the dish collecting apparatus according to any one of the first to fifth aspects, wherein the processing unit includes: a first counting unit that, in a case in which the determining part determines that the first-type dish has passed through the collecting slot, counts the number of first-type dishes; and a first processing unit that performs processing related to a predetermined output operation according to the number counted by the first counting unit.

With this configuration, it is possible to perform a predetermined output operation according to the number of first-type dishes that have passed through the collecting slot.

Furthermore, a seventh aspect of the present invention is directed to the dish collecting apparatus according to the sixth aspect, wherein the processing unit further includes a second processing unit that, in a case in which the determining part determines that the second-type dish has passed through the collecting slot, performs processing related to a predetermined output operation in a mode different from that of the first processing unit.

With this configuration, in the case in which the second-type dish has passed through the collecting slot, it is possible to perform a predetermined output operation different from that in the case in which the first-type dish has passed.

Furthermore, an eighth aspect of the present invention is directed to the dish collecting apparatus according to the seventh aspect, wherein the processing unit further includes a second counting unit that, in a case in which the determining part determines that the second-type dish has passed through the collecting slot, counts the number of second-type dishes, and the second processing unit performs the processing related to the predetermined output operation according to the number counted by the second counting unit.

With this configuration, it is possible to perform a predetermined output operation according to the number of second-type dishes that have passed through the collecting slot.

Furthermore, a ninth aspect of the present invention is directed to the dish collecting apparatus according to any one of the first to eighth aspects, wherein the processing related to the predetermined output operation that is performed by the processing unit includes processing for outputting a prize from a prize output apparatus having a prize output function.

With this configuration, it is possible to output a prize from a prize output apparatus.

Furthermore, a tenth aspect of the present invention is directed to the dish collecting apparatus according to any one of the first to ninth aspects, wherein the processing related to the predetermined output operation that is performed by the processing unit includes processing for changing display content of a display device having an information displaying function.

With this configuration, it is possible to change the display content of the display device.

Furthermore, an eleventh aspect of the present invention is directed to the dish collecting apparatus according to any one of the first to tenth aspects, wherein the processing related to the predetermined output operation that is performed by the processing unit includes processing for transmitting a determination result of the determining part, in association with an identifier for identifying a collecting slot through which the first-type dish or the second-type dish has passed, to an information processing apparatus that is communicable with the dish collecting apparatus.

With this configuration, it is possible to transmit a determination result to an information processing apparatus.

Advantageous Effects of Invention

According to the dish collecting apparatus of the present invention, it is possible to determine multiple types of dishes with different shapes that pass through a collecting slot.

BRIEF DESCRIPTION OF DRAWINGS

FIG. 10 is a table illustrating a method for determining a dish that passes in the dish collecting apparatus in the embodiment.

FIG. 13 is a table illustrating a method for determining a dish that passes in the dish collecting apparatus according to the modified example of the embodiment.

DESCRIPTION OF EMBODIMENT

Figure 1:
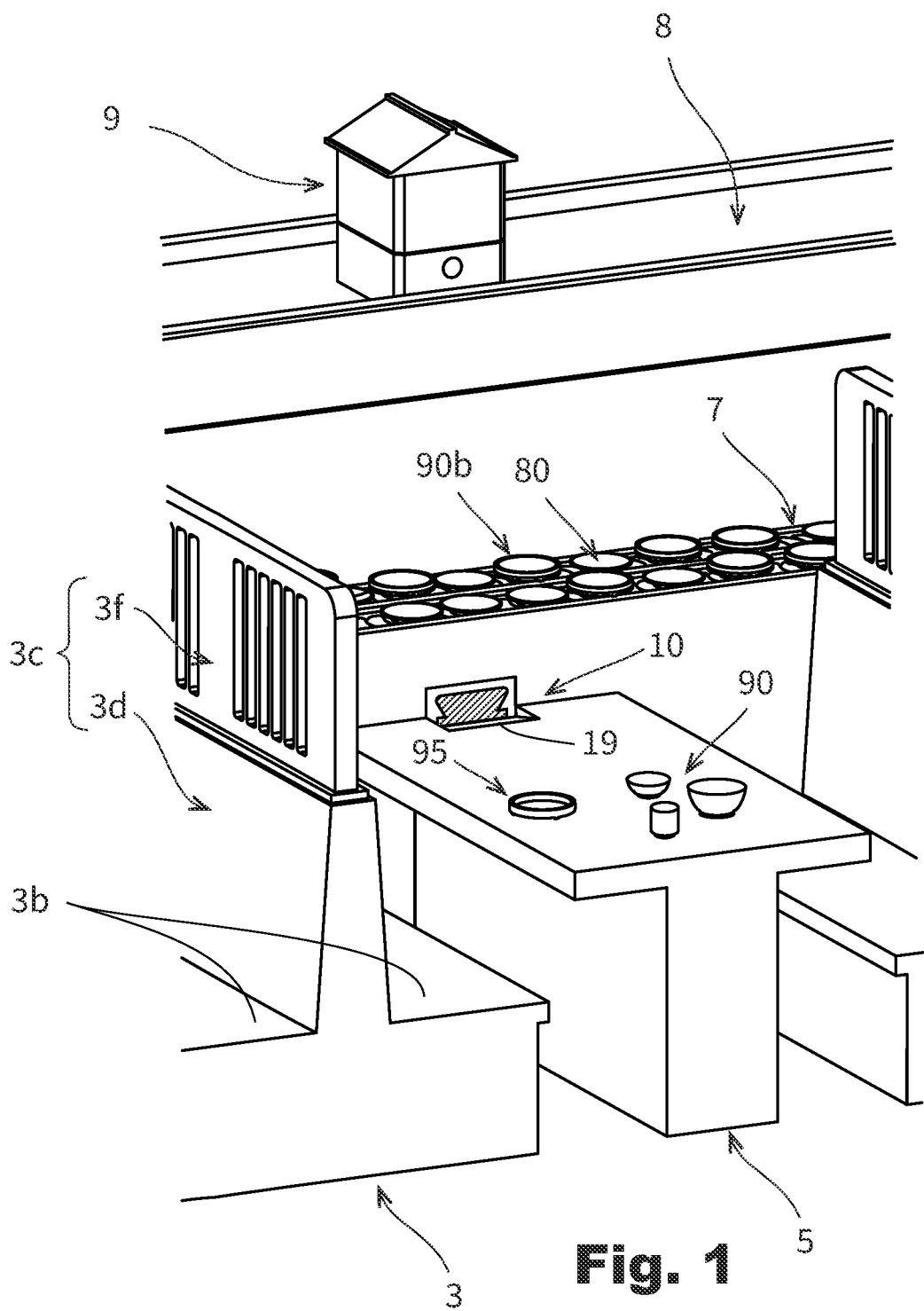
FIG. 1 is a perspective view illustrating a store system using a dish collecting apparatus according to this embodiment.

Hereinafter, an embodiment of a store system and the like using a dish collecting apparatus will be described with reference to the drawings. It should be noted that constituent elements denoted by the same reference numerals in the embodiments perform similar operations, and thus a description thereof may not be repeated.

Although the shape and positional relationship of parts may be described by indicating directions in the following description, the indication of directions is only for convenience of explanation and does not limit the orientation or posture of the apparatuses and the like according to the present invention during use.

An identifier for a certain matter in the following description is a text character, a sign, or the like for uniquely indicating the matter concerned. The identifier is an ID, for example, but may be any type of information with which the corresponding matter can be identified. That is to say, the identifier may be a name of the matter itself that it indicates, or it may be a set of signs that are combined so as to uniquely correspond to the matter.

Embodiment

The outline of this embodiment is as follows. A dish collecting apparatus causes a dish that passes through a collecting slot to be collected in a dish collecting portion in restaurants. The dish collecting apparatus includes a processing unit that determines whether a first-type dish has passed through the collecting slot or a second-type dish whose shape is different from that of the first-type dish has passed through the collecting slot, and performs predetermined processing according to a determination result. The dish collecting apparatus has at least two sensors that each detect an object that passes through a predetermined detection range in the collecting slot, and performs determination according to detection results of the sensors. It is preferable that two sensors out of the sensors have detection ranges at different heights. It is also preferable that two sensors out of the sensors have detection ranges at different positions in the width direction. In the embodiment below, for example, at least three sensors are provided, and it is determined whether the first-type dish has passed through the collecting slot or the second-type dish has passed through the collecting slot, based on a combination of detection results of the three sensors. Furthermore, it is possible to determine whether the first-type dish has passed through the collecting slot, the second-type dish has passed through the collecting slot, or a third-type dish whose shape is different from those of the first-type dish and the second-type dish has passed through the collecting slot, based on a combination of detection results of the three sensors.

Furthermore, in this embodiment, if it is determined that a first-type dish has passed through the collecting slot, the processing unit counts the number of first-type dishes, and performs processing related to a predetermined output operation according to the counted number. The processing related to the predetermined output operation is processing for outputting a prize from a prize output apparatus, processing for changing the display content of a display device, processing for transmitting a determination result in association with an identifier for identifying a collecting slot, or the like, for example, but there is no limitation to this. If it is determined that a second-type dish has passed through the collecting slot, the processing unit performs processing related to a predetermined output operation in a mode different from that described above. The different mode means that the criteria and contents are different in the processing related to the same type of operation, or that the processing relates to different types of operation, for example.

The following is a description of the configuration of a store system using the thus configured dish collecting apparatus according to this embodiment will be described. In this embodiment, the dish collecting apparatus is used in a store system used in a restaurant and including a dish collecting portion for collecting dishes.

FIG. 1 is a perspective view illustrating a store system 1000 using a dish collecting apparatus 10 according to this embodiment.

As shown in FIG. 1, the store system 1000 according to this embodiment is used in stores such as restaurants, for example. FIG. 1 shows part of the system. The restaurants are so-called conveyor belt sushi restaurants, for example. The stores in which the store system 1000 is used may be restaurants of any other type of business or industry. In addition, items served to user who ordered the items may be paid or free of charge.

In this embodiment, the store system 1000 includes bench-type seat units 3 (which may be simply referred to as "seat units" hereinafter), tables 5, a conveying apparatus 7, an upper unit 8, prize output apparatuses 9, and dish collecting apparatuses 10. The conveying apparatus 7 is provided over an area between the inside of the store in which users who are customers have a meal and the inside of the kitchen that is not shown in the drawings. The other constituent elements are provided inside the store.

In this embodiment, one seat in which one customer group has a meal is constituted by one table 5 and seat units 3 corresponding thereto. That is to say, the seat is a concept that indicates a unit in which the bill is given to the customer group corresponding to seat units or a table to which items are served. Such seats are arranged along the conveying apparatus 7. One dish collecting apparatus 10 is located at each table 5. In other words, dish collecting apparatuses 10 are arranged along the conveying apparatus 7. In this embodiment, each dish collecting apparatus 10 is used for one customer group. Two or more dish collecting apparatuses 10 may be located at one table. The form and arrangement of the tables 5 used in the store system 1000 are not limited to this. For example, seats each constituted by a table or seat unit for a group of a small number of customers (e.g., one or two customers) arranged side by side along the conveying apparatus 7 may be provided. In this case, the dish collecting apparatuses 10 may be provided along the conveying apparatus 7 such that one or more dish collecting apparatuses 10 are used at each seat.

Figure 2:
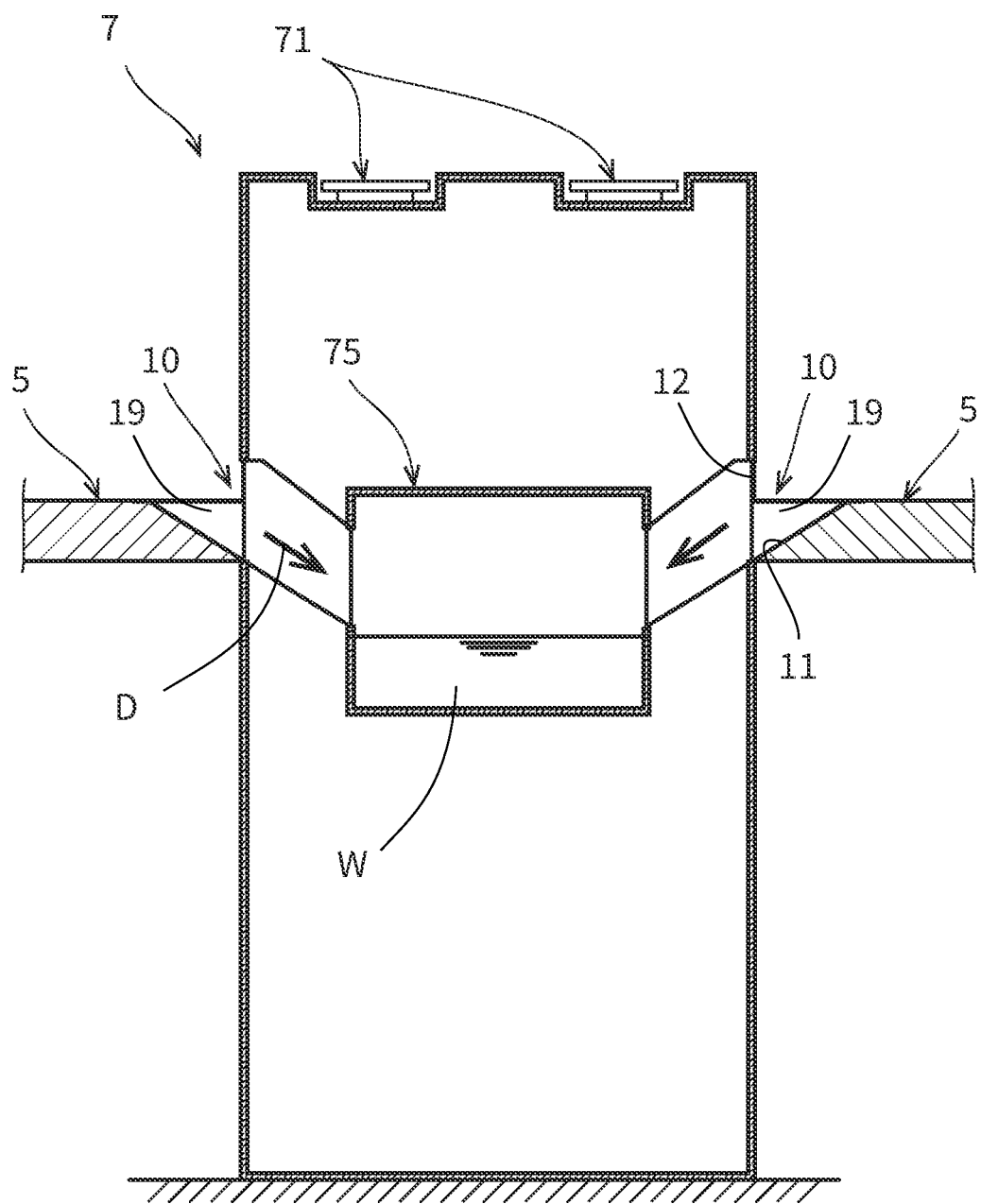
FIG. 2 is a cross-sectional view showing a conveying apparatus of the store system in the embodiment.

FIG. 2 is a cross-sectional view showing the conveying apparatus 7 of the store system 1000.

As shown in FIG. 2, the conveying apparatus 7 includes a conveyor 71 and a dish collecting portion 75. The conveyor 71 is located in the upper portion of the conveying apparatus 7. First-type dishes 80 and the like, which are plates with food and drink such as sushi (not shown) thereon are placed on the conveyor 71. The conveyor 71 is installed such that the first-type dishes 80 are conveyed in the vicinity of the tables 5. The conveyor 71 is constituted by a crescent chain whose upper face is formed flat, for example, but there is no limitation to this. The conveying apparatus 7 drives the conveyor 71, and thus the first-type dishes 80 and the like placed thereon move along a predetermined path to travel between the inside of the store and the inside of the kitchen. In addition to the first-type dishes 80, other types of dishes and the like may be placed on the conveyor 71.

The dish collecting portion 75 is located inside the conveying apparatus 7 (i.e., below the conveyor 71). The dish collecting portion 75 is constituted by a water passage through which water W flows as shown in the drawing, a collecting tank (not shown) installed downstream of the water passage, and the like. The detailed structure of the dish collecting portion 75 may be the same as that described in Japanese Patent No. 3859962, for example, but there is no limitation to this. It is sufficient that the dish collecting portion is configured to collect the dishes that are collected.

As shown in FIG. 1, the upper unit 8 is located above the conveyor 71. The upper unit 8 has a built-in lighting unit and is configured to emit light downward so as to illuminate the conveyor 71, for example. Dishes and the like for use by users may be placed on the upper face of the upper unit 8, for example.

The prize output apparatus 9 has a mechanical structure similar to that of the prize ejecting mechanism as described in Japanese Patent No. 3859962, for example, but there is no limitation to this. In this embodiment, the prize output apparatus 9 is configured to, upon receiving a prize output instruction transmitted from another apparatus via a network, output a prize in response to the instruction. Note that the prize is not limited to tangible things, but may be a coupon code exchangeable for an item or other tangible things, a point, or the like. The outputting a prize may be performed by delivering a thing from the prize output apparatus 9 to a user. The outputting a prize may also be performed by displaying information on a display device provided on the prize output apparatus 9 and the like as well as a part of the store system 1000, transmitting information to a terminal apparatus or the like owned by a user, or displaying information on a display device of the terminal apparatus.

In this embodiment, each bench-type seat unit 3 has two seat faces 3b and a backrest portion 3c. The backrest portion 3c is a portion of the bench-type seat unit 3 that extends upward from the seat faces 3b. The backrest portion 3c may be said to be a portion located on the back side of users seated on the seat faces 3b. In this embodiment, the backrest portion 3c has a backrest 3d and a protruding portion 3f. The backrest 3d is a portion mainly for allowing a seated user to lean on the back side. The protruding portion 3f is a portion protruding upward from the upper portion of the backrest 3d. The use of such a seat unit 3 can keep a customer group using one table 5 adequately separate from a customer group using another table 5, so that each group of customers can enjoy their meals.

As shown in FIG. 2, in this embodiment, each dish collecting apparatus 10 is located between the upper face of the table 5 and the water passage of the dish collecting portion 75. The dish collecting apparatus 10 has a collecting slot 19 that is exposed on the upper face of the table 5. The dish collecting apparatus 10 constitutes an introduction passage that guides dishes and the like put into the collecting slot 19 in the direction indicated by the arrow D in the drawing (which may be simply referred to as an "introduction direction D" hereinafter) to the water passage of the dish collecting portion 75, and causes dishes that pass through the collecting slot 19 to be collected in the dish collecting portion 75. In this embodiment, the seats including the tables 5 may be arranged on the two sides of the conveying apparatus 7. That is to say, the dish collecting apparatuses 10 are arranged at the tables 5 respectively provided on the two sides of the conveying apparatus 7, and thus dishes can be collected from the tables 5 to the dish collecting portion 75.

In this embodiment, the dish collecting apparatuses 10 are configured to collect not only the first-type dishes 80 that are plates but also second-type dishes 90 and third-type dishes 95 from the collecting slot 19 into the dish collecting portion 75.

In this embodiment, the first-type dishes 80 are commonly used plates each having a substantially disk-like plate board and a base. The base is the underside that comes into contact with the upper face of the conveyor 71, the surface of the tables 5, or the like when the first-type dish 80 is placed thereon, for example. In the store system 1000 for use in conveyor belt sushi restaurants, the first-type dishes 80 are used in the state in which food such as nigiri-zushi or rolled sushi is placed (or may be said to be accommodated) on the plate board, but the application thereof is not limited to this.

The second-type dishes 90 are dishes whose shape is different from that of the first-type dishes 80. That is to say, in this embodiment, the second-type dishes 90 are dishes other than plates, and are, for example, those called tea mugs, soup bowls, udon bowls, rice bowls, small bowls, or the like, but there is no limitation to this.

The third-type dishes 95 are dishes whose shape is different from those of the first-type dishes 80 and the second-type dishes 90. In this embodiment, the third-type dishes 95 are attachments that are used for multiple-plate sets 90b, for example. Each multiple-plate set 90b is obtained by detachably combining one attachment with two first-type dishes 80 into one piece. For example, in the case where the number of first-type dishes 80 on which food and drink are placed represents the price of the food and drink, it is possible to appropriately give the bill to users for the food and drink by serving food and drink using the multiple dish set 90b in which two first-type dishes 80 are stacked together, in relation to the price of the food and drink to be served. It is also possible that the multiple-plate set 90b is obtained by combining one or at least two attachments with three or more first-type dishes 80 into one piece. The third-type dishes 95 that are attachments have a substantially ring-like shape, for example. In other words, the third-type dishes 95 can be said to have a cylindrical shape. The ring-like shape may be a polygonal shaped ring, or may be partially interrupted. The dimension in the height direction of each third-type dish 95 is approximately the same as the height of a first-type dish 80, but there is no limitation to this.

The dishes may include plates, bowls, cups, chopsticks, spoons, forks, and the like, and refer to a concept that can encompass a wide range of other utensils used in meals and serving, etc., such as utensils used for serving. The dish collecting apparatus 10 is not limited to collecting dishes that are used for meals and the like and reused after collection and washing and other processes, but may also be used to collect dishes that are not reused.

Other examples of the detailed configuration the dish collecting apparatus 10 will be described later.

Figure 3:
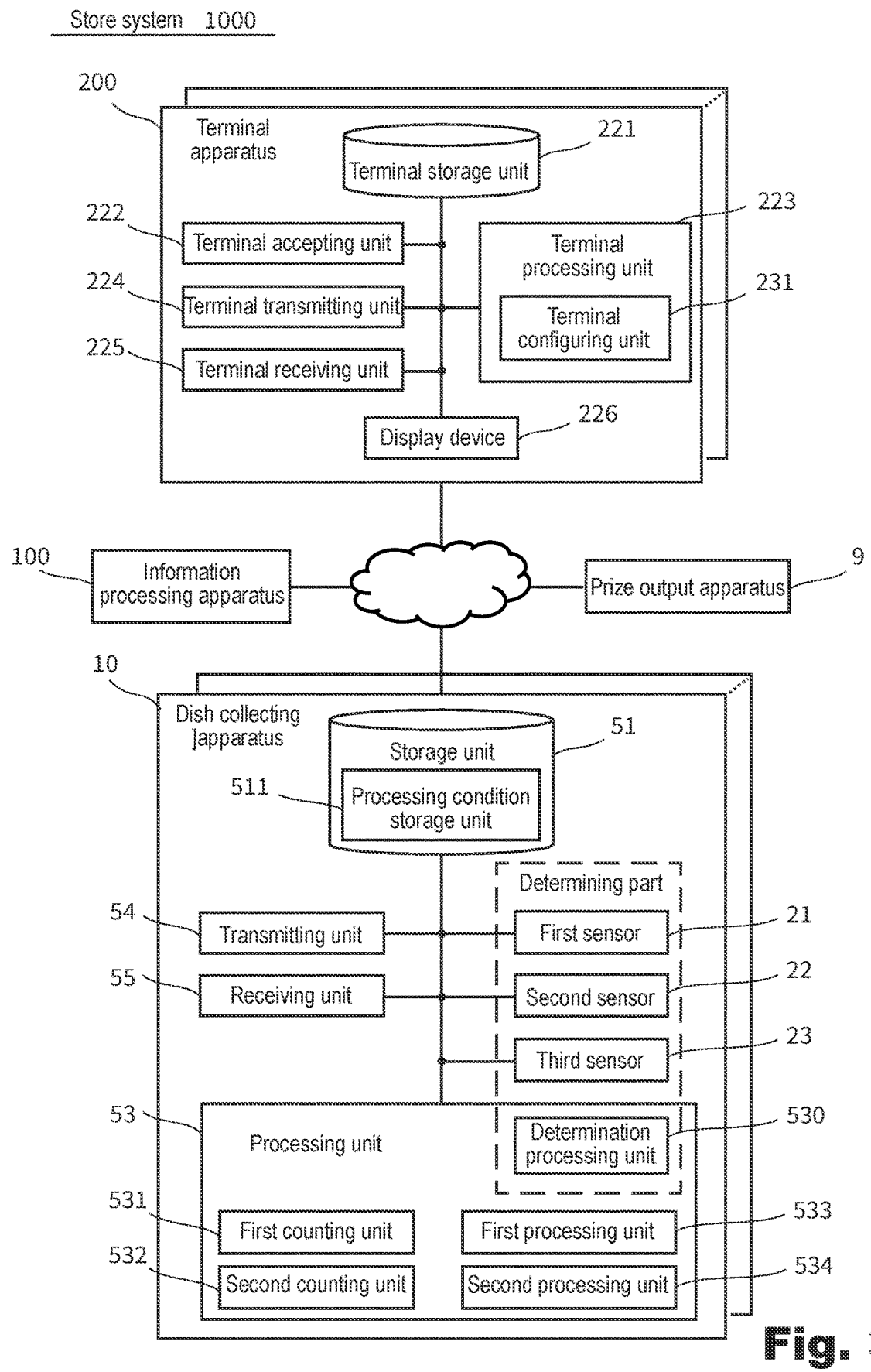
FIG. 3 is a block diagram of the store system in the embodiment.
Figure 4:
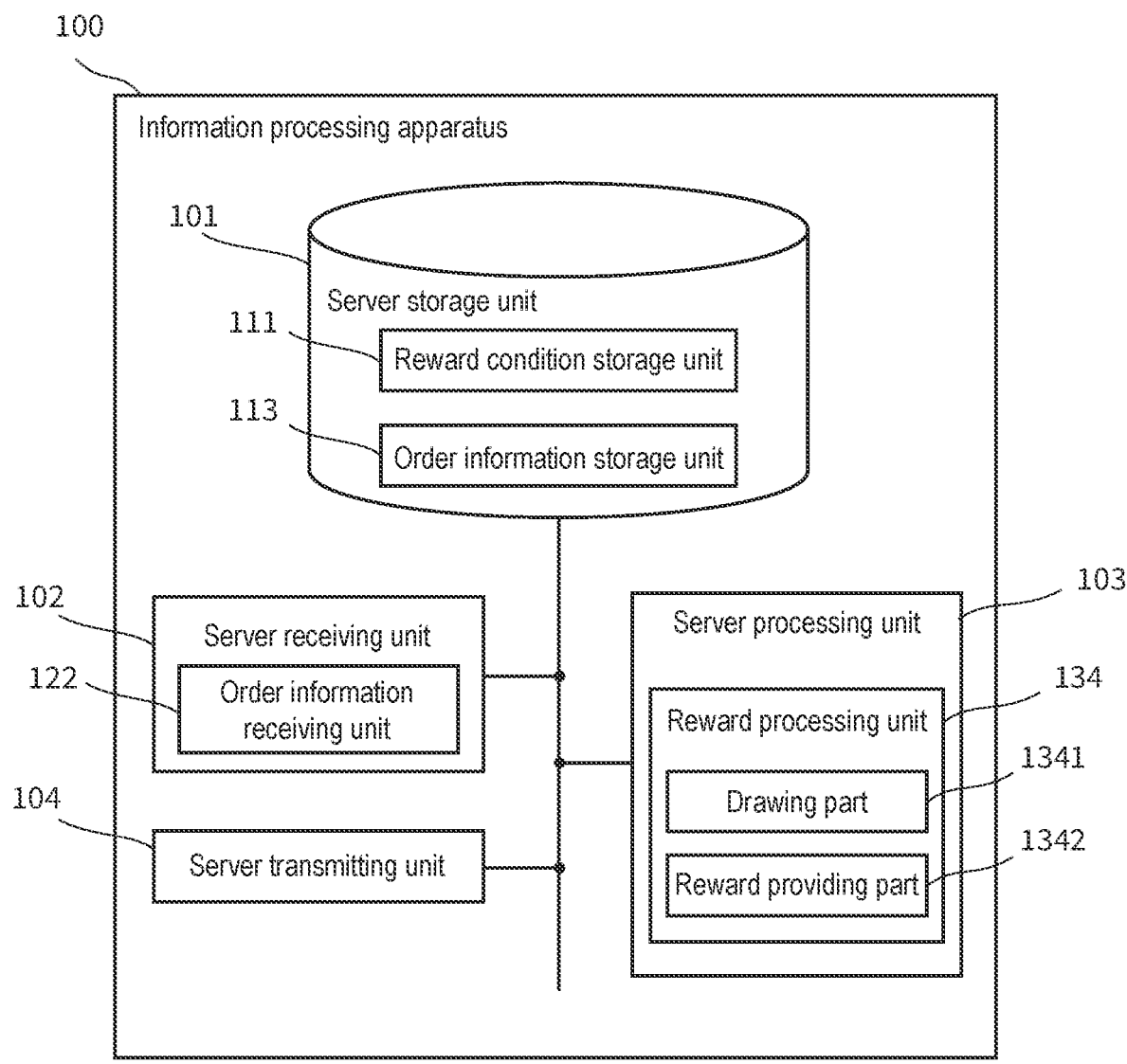
FIG. 4 is a block diagram of an information processing apparatus in the embodiment.

FIG. 3 is a block diagram of the store system 1000. FIG. 4 is a block diagram of an information processing apparatus 100.

In this embodiment, the store system 1000 further includes the information processing apparatus 100 and terminal apparatuses 200. The dish collecting apparatuses 10, the information processing apparatus 100, the terminal apparatuses 200, and the prize output apparatus 9 are communicatively connected to each other via a network (which may be of any type such as a LAN, the Internet, etc.). In this embodiment, the store system 1000 enables users to order items at each seat, for example. The configuration of the store system 1000 is not limited to this. There is no limitation on the number of each type of apparatuses included in the store system 1000, and other apparatuses may be included in the store system 1000.

As shown in FIG. 4, the information processing apparatus 100 includes a server storage unit 101, a server receiving unit 102, a server processing unit 103, and a server transmitting unit 104. The information processing apparatus 100 is a server, for example. The information processing apparatus 100 may be constituted by one server or multiple servers that operate in coordination with each other. The information processing apparatus 100 may be a computer or other device built into other equipment. It will be appreciated that the server may be a so-called cloud server, an ASP server, or the like, and there is no limitation on the type thereof.

The server storage unit 101 includes a reward condition storage unit 111 and an order information storage unit 113.

For example, information and the like acquired by the units of the server receiving unit 102 or the units of the server processing unit 103 are stored in the units of the server storage unit 101 as described later.

A reward condition for performing reward processing, which is processing that provides a reward, is stored in the reward condition storage unit 111. The reward condition includes a condition regarding the price of items purchased by each customer group, a condition regarding the total number of items purchased by each customer group, and the like, for example, but there is no limitation to this. The reward condition is set in advance and stored in the reward condition storage unit 111, for example, but may be changed as needed. The reward condition may be information containing an identifier for identifying an item or a dish that is eligible for a reward, the type thereof, or the like, or information containing an identifier for identifying an item or a dish that is not eligible for a reward, the type thereof, or the like, for example.

In this embodiment, the reward processing includes processing for transmitting a prize output instruction to the prize output apparatus 9 configured to output a prize, for example. The prize output instruction is an instruction to cause the prize output apparatus 9 to output a prize. That is to say, the reward processing can be said to include reward providing processing that provides a prize to a customer group. In this embodiment, the reward processing includes drawing processing that determines a drawing result of a customer group, for example. The reward processing is processing that provides a prize by performing reward providing processing for a customer group which was selected as a winner as a result of drawing processing, for example. It can be considered that the customer group is the same as the seat.

Order information received by an order information receiving unit 122 is stored in the order information storage unit 113. The order information is information regarding an order for an item, the information having a seat identifier or a terminal identifier for specifying a seat. The order information is information transmitted from the terminal apparatuses 200, for example. That is to say, in this embodiment, an order for an item can be accepted at each seat, and the order information is stored in the information processing apparatus 100. In other words, in this embodiment, users in a customer group can order an item for each customer group. The order information has an item identifier for uniquely identifying an item, for example. The order information has an item identifier and the number of items ordered, for example. The order information may have an item identifier and a price, for example. Typically, two or more pieces of item management information each having an item identifier and a unit price are stored in the server storage unit 101 of the information processing apparatus 100. The item management information is a database in which an item identifier and its unit price are recorded in association with each other, for example. The item management information may be stored in other apparatuses. With such item management information, the unit price for the item identifier contained in the order information can be specified. That is to say, the price corresponding to the item identifier contained in the order information can be calculated. The order information may be information indicating that a plate with an item thereon was served (provided) to a customer group. In other words, the order information may be post-order information.

In this embodiment, in the case in which a settlement (payment for an item) is made, the order information of the seat is reset. In the case in which reward processing is performed and a reward is provided, the order information of the seat becomes irrelevant to the reward processing, but there is no limitation to this.

The server receiving unit 102 includes the order information receiving unit 122. The server receiving unit 102 receives information and the like transmitted from another apparatus. The received information can be stored in the server storage unit 101, for example.

The order information receiving unit 122 receives one or more pieces of order information transmitted from the terminal apparatuses 200. The order information receiving unit 122 accumulates the received order information in the order information storage unit 113. In this embodiment, for example, the order information receiving unit 122 can receive order information having seat specifying information corresponding to a same seat, from two or more terminal apparatuses 200 associated with the same seat.

The server processing unit 103 includes a reward processing unit 134.

The server processing unit 103 performs various types of processing. The various types of processing are processing that is performed by the units of the server processing unit 103 as follows, for example.

In the case in which the order information receiving unit 122 receives order information, for example, the server processing unit 103 performs order processing. That is to say, the server processing unit 103 receives an order for items identified with an item identifier contained in the order information, in the number specified in the order information, with respect to a seat specified with an identifier contained in the order information. Accordingly, the store starts preparations to provide the ordered items, to the seat.

In this embodiment, the server processing unit 103 determines whether or not one or more pieces of order information received by the order information receiving unit 122 match the reward condition stored in the reward condition storage unit 111. The determination is performed for each identifier contained in the order information. The determining that order information matches the reward condition means that the procedure is allowed to advance to the reward processing, and the determining that order information does not match the reward condition means that the procedure is not allowed to advance to the reward processing. The server processing unit 103 determines, for each seat, whether or not two or more pieces of order information corresponding to that seat match the reward condition. In other words, the server processing unit 103 determines, for each customer group, whether or not order information based on two or more orders of that customer group matches the reward condition.

The reward processing unit 134 in this embodiment includes a drawing part 1341 and a reward providing part 1342.

In the case in which the server processing unit 103 determines that order information matches the reward condition, the reward processing unit 134 performs the reward processing on a seat corresponding to the order information. In this embodiment, in the case in which an instruction to perform the reward processing is transmitted from a dish collecting apparatus 10, the reward processing unit 134 performs the reward processing on a seat corresponding to that dish collecting apparatus 10. As described above, the reward processing includes drawing processing and reward providing processing, for example. Note that the reward processing unit 134 may perform only reward providing processing.

The drawing part 1341 performs drawing processing that determines whether or not each customer group is a winner and to be provided with a reward. The drawing processing can be performed using various methods. For example, a winner may be randomly determined using a pseudo-random number, or a winner may be determined each time a predetermined number of drawings are conducted so that a winner is selected with a predetermined probability for each customer group. The drawing processing may be performed in the case in which an instruction from a user is input through the terminal apparatus 200, or may be performed regardless of the presence or absence of such an instruction from a user.

The reward providing part 1342 performs reward providing processing that provides a reward to a seat. The reward providing processing is, for example, processing that transmits a prize sending instruction to the prize output apparatus 9. More specifically, for example, it is processing that transmits a prize sending instruction, thereby opening an item port of the prize output apparatus 9 and allowing one prize to be ejected out of the prize output apparatus 9.

The server transmitting unit 104 can transmit information acquired by the server processing unit 103 and the like to an external apparatus. Since the server receiving unit 102 and the server transmitting unit 104 are provided, the information processing apparatus 100 is connected to a network and can communicate with other apparatuses connected to the network.

Next, the terminal apparatuses 200 will be described. In this embodiment, each terminal apparatus 200 is an information terminal apparatus allocated to each table 5 or each seat (i.e., each customer group), for example, but there is no limitation to this. For example, a portable information terminal apparatus such as a so-called smart phone owned by a user, a tablet-type information terminal apparatus, a personal computer (PC) such as a laptop, or the like may be used as the terminal apparatus 200, but there is no limitation to this. A user (a user in a customer group) of the store system 1000 can use the terminal apparatus 200 to order food and drink in the store system 1000, for example. In the following example, it is assumed that a so-called tablet-type apparatus is used as the terminal apparatus 200, but there is no limitation to this.

In this embodiment, the terminal apparatus 200 may be arranged in the upper unit 8. For example, the upper unit 8 is provided with a side wall that faces the table 5. The side wall portion can display information such as items that can be ordered and other information for users, for example. The side wall portion may be provided with an operation terminal (not shown) or the like for accepting an order operation from a user, for example. The operation terminal may be a tablet-type computer or the like, for example, but there is no limitation to this.

As shown in FIG. 3, the terminal apparatus 200 includes a terminal storage unit 221, a terminal accepting unit 222, a terminal processing unit 223, a terminal transmitting unit 224, a terminal receiving unit 225, and a display device 226. The terminal apparatus 200 has a display device with a touch panel, for example, but there is no limitation to this. The terminal apparatus 200 can be connected to a network and can communicate with other apparatuses connected to the network.

Various types of information, programs, and the like are stored in the terminal storage unit 221. In this embodiment, information for specifying a seat corresponding to the terminal apparatus 200 is stored in the terminal storage unit 221. As the information for specifying a seat, for example, an identifier for identifying a terminal or an identifier for identifying a seat is stored.

The terminal accepting unit 222 accepts an ordering instruction having an item identifier, in response to an operation for ordering an item by a user of the terminal apparatus 200. The operation for ordering an item is performed on a predetermined menu screen output by the terminal processing unit 223 to the display device 226, for example, but there is no limitation to this. In this embodiment, the terminal accepting unit 222 may accept an instruction from the user of the terminal apparatus 200 to advance the procedure to the reward processing. The instruction to advance the procedure to the reward processing may be accepted in the case in which the reward condition is satisfied, for example.

The terminal processing unit 223 includes a terminal configuring unit 231. The terminal processing unit 223 controls operations of the units of the terminal apparatus 200, thereby causing the terminal apparatus 200 to function.

In response to an ordering instruction accepted by the terminal accepting unit 222, the terminal configuring unit 231 configures order information containing the item identifier contained in the ordering instruction and the seat specifying information. The terminal configuring unit 231 accumulates the configured order information in the terminal storage unit 221, for example.

The terminal transmitting unit 224 reads the order information configured by the terminal configuring unit 231, from the terminal storage unit 221 or the like, and transmits the order information. The order information is typically transmitted to the information processing apparatus 100. In this embodiment, in the case in which the terminal accepting unit 222 accepts an instruction to advance the procedure to the reward processing, the terminal transmitting unit 224 accordingly transmits a reward instruction, which is an instruction to perform reward processing. The reward instruction is typically transmitted to the information processing apparatus 100. For example, the terminal transmitting unit 224 may transmit a prize sending instruction to the prize output apparatus 9 or the like.

The terminal receiving unit 225 receives information transmitted from the information processing apparatus 100 or other apparatuses via a network. The terminal receiving unit 225 accumulates the received information in the terminal storage unit 221, for example, thereby enabling the terminal processing unit 223 and the like to acquire the information.

The display device 226 is a touch panel, for example, and outputs information. Note that the method of outputting the information is not limited to that using the display device 226, and the information may be output by outputting voice or the like from a speaker or the like. The display device 226 outputs an order screen for ordering an item based on the information stored in the terminal storage unit 221, for example. Accordingly, the user of the terminal apparatus 200 can give an ordering instruction using the terminal apparatus 200. Note that the order screen information for outputting the order screen may be received in advance from the information processing apparatus 100 and stored in the terminal storage unit 221, for example, or may be received from the information processing apparatus 100 at any time when the order screen is output and stored in the terminal storage unit 221.

Next, the configuration of the dish collecting apparatuses 10 will be described.

Each dish collecting apparatus 10 includes a storage unit 51, a processing unit 53, a transmitting unit 54, and a receiving unit 55. The dish collecting apparatus 10 has three sensors 21, 22, and 23 consisting of a first sensor 21, a second sensor 22, and a third sensor 23.

The sensors 21, 22, and 23 are each configured to detect an object that passes through a predetermined detection range in an introduction passage from the collecting slot 19 to the dish collecting portion 75. There is no limitation on the type of sensors 21, 22, and 23. For example, the sensors may each have a component that is mechanically displaced in response to the passage of an object and outputs an output signal or the like in response to such displacement, or may detect light rays or waves and output an output signal or the like to enable detection of the presence or absence, position, and the like of an object within the detection range. In this embodiment, for example, so-called photoelectric sensors are used as the sensors 21, 22, and 23. In addition, various other types of known sensors such as proximity sensors can be used. The multiple sensors used in the dish collecting apparatus 10 may be of the same type as each other or of different types from each other.

Information for use in the processing performed by the processing unit 53, other information for use in the function of the dish collecting apparatus 10, and the like are stored in the storage unit 51.

In this embodiment, the storage unit 51 includes a processing condition storage unit 511. A processing condition, which is a condition for processing in the processing unit 53 as described later, is stored in the processing condition storage unit 511. The processing condition is a condition regarding the number of first-type dishes 80 counted by the processing unit 53, a condition regarding the number of second-type dishes 90 counted by the processing unit 53, and the like, for example. The processing condition may include a condition regarding the number of third-type dishes 95 counted by the processing unit 53 and other conditions. The processing condition is set in advance and stored in the processing condition storage unit 511, for example, but may be changed as needed. The processing condition may be information containing an identifier for identifying a dish that is eligible for a reward, the type thereof, or the like, or information containing an identifier for identifying a dish that is not eligible for a reward, the type thereof, or the like, for example.

The processing unit 53 controls operations of the units of the dish collecting apparatus 10. The processing unit 53 functions as a controller for the sensors 21, 22, and 23. The processing unit 53 in this embodiment includes a determination processing unit 530, a first counting unit 531, a second counting unit 532, a first processing unit 533, and a second processing unit 534.

In this embodiment, the determination processing unit 530 determines the type of dishes that have passed through the collecting slot 19 in the dish collecting apparatus 10, that is, the type of dishes that have passed through the introduction passage, according to detection results of the three sensors 21, 22, and 23. That is to say, in this embodiment, the determination processing unit 530 and the three sensors 21, 22, and 23 constitute a determining part that determines whether the first-type dish 80 has passed through the collecting slot 19 or the second-type dish 90 whose shape is different from that of the first-type dish 80 has passed through the collecting slot 19. In other words, in this embodiment, the determining part can be said to include the three sensors 21, 22, and 23, and the determination processing unit 530 that is realized by the processing unit 53 as described later.

More specifically, in this embodiment, the determination processing unit 530 can determine whether the first-type dish 80 has passed through the collecting slot 19, the second-type dish 90 has passed through the collecting slot 19, or the third-type dish 95 has passed through the collecting slot 19. The determination processing unit 530 can determine a dish that has passed through the collecting slot 19, based on detection results of the sensors 21, 22, and 23. The determination can be performed according to a combination of detection results of the sensors 21, 22, and 23. It is also possible that the number of sensors is four or more, and the determination processing unit 530 is configured to determine a dish based on a combination of detection results of at least three sensors out of the sensors. Detailed examples of detection results of the sensors 21, 22, and 23 and determination will be described later.

The determination processing unit 530 includes circuitry (which may be constituted by hardware, or software and a processor for functioning the same) or the like constituting a decision logic that outputs information according to the output of the three sensors 21, 22, and 23, for example, but there is no limitation to this.

The processing unit 53 performs the following predetermined processing according to a determination result of the determining part, that is, a determination result of the determination processing unit 530.

If the determination processing unit 530 determines that the first-type dish 80 has passed through the collecting slot 19, the first counting unit 531 counts the number of the first-type dishes. If the determination processing unit 530 determines that the second-type dish 90 has passed through the collecting slot 19, the second counting unit 532 counts the number of the second-type dishes. If the determination processing unit 530 determines that the third-type dish 95 has passed through the collecting slot 19, the processing unit 53 may be configured to count the number of the third-type dishes. The unit that performs this counting may be referred to as a third counting unit.

The number counted by the first counting unit 531 and the number counted by the second counting unit 532 may be reset at a predetermined point in time. The predetermined point in time may be the time when processing is performed by the first processing unit 533 as described below, or the time when processing is performed by the second processing unit 534, for example. Alternatively, the predetermined point in time may be the time when a predetermined operation is performed by a store staff member or the like. For example, if a reset instruction is transmitted from the terminal apparatus 200 or the information processing apparatus 100 to the dish collecting apparatus 10 in response to a predetermined operation being performed on the terminal apparatus 200 or other apparatuses, the number counted by the first counting unit 531 and the number counted by the second counting unit 532 may be reset.

In this embodiment, the first processing unit 533 performs first processing regarding a predetermined first output operation, according to the first count number counted by the first counting unit 531. The second processing unit 534 performs second processing regarding a predetermined second output operation in a mode different from that of the first processing unit 533, according to the second count number counted by the second counting unit 532. The first processing unit 533 and the second processing unit 534 can perform the first processing and the second processing, based on the processing conditions stored in the processing condition storage unit 511. More specifically, the first processing unit 533 compares the first count number of the first-type dishes 80 with a condition regarding the number prescribed in the processing condition, for example, and performs the first processing in the case in which the processing condition is satisfied. The second processing unit 534 compares the second count number of the second-type dishes 90 with a condition regarding the number prescribed in the processing condition, for example, and performs the second processing in the case in which the processing condition is satisfied. The processing condition regarding the first count number and the processing condition regarding the second count number are typically set separately and independently.

The first output operation and the second output operation being in different modes may mean that the first output operation and the second output operation are of different types. For example, one may be outputting an object that is a prize or performing drawing processing therefor, and the other may be providing a coupon code or points that can be exchanged for an item or the like or performing drawing processing therefor. Alternatively, the first output operation and the second output operation being in different modes may mean that, even when the first output operation and the second output operation are the same type of operation, the criteria for performing the operation or the content of the operation are different therebetween. For example, if both the first output operation and the second output operation are operations to output an object as a prize or to perform drawing processing therefor, the count number that allows such operations to be performed may be set at different levels therebetween. For example, if both the first output operation and the second output operation are operations to output information to the display device 226, the content of the display may be different therebetween.

The transmitting unit 54 transmits information and the like acquired by the processing unit 53, to another apparatus. The receiving unit 55 receives information transmitted from another apparatus and stores it in the storage unit 51, thereby enabling the processing unit 53 and the like to acquire the information.

The processing unit 53, the server processing unit 103, and the terminal processing unit 223 can be realized typically by MPUs, memories, or the like. Typically, the processing procedure of the processing unit 53, the server processing unit 103, and the terminal processing unit 223 is realized by software, and the software is stored in a recording medium such as a ROM. Note that the procedure may be realized also by hardware (dedicated circuits).

Furthermore, the receiving unit 55, the server receiving unit 102, and the terminal receiving unit 225 are typically realized by wireless or wired communication parts, but may be realized by broadcast receiving parts.

Furthermore, the transmitting unit 54, the server transmitting unit 104, and the terminal transmitting unit 224 are typically realized by wireless or wired communication parts, but may be realized by broadcasting parts.

Furthermore, the storage unit 51, the server storage unit 101, and the terminal storage unit 221 are preferably non-volatile recording media, but can be realized by volatile recording media. There is no limitation on the procedure in which such information and the like are stored in these storage units. For example, the information may be stored in these storage units via a recording medium, the information transmitted via a communication line or the like may be stored in these storage units, or the information input via an input device may be stored in these storage units.

In this embodiment, it is assumed that the first output operation is an operation that outputs a prize from the prize output apparatus 9, for example. In this case, the first processing that is performed by the first processing unit 533 includes processing for outputting a prize from the prize output apparatus 9. That is to say, if the first processing unit 533 performs such first processing, the transmitting unit 54 is caused to transmit a reward instruction. The reward instruction is typically transmitted to the information processing apparatus 100. For example, the prize sending instruction may be transmitted from the transmitting unit 54 to the prize output apparatus 9 or the like.

Furthermore, in this embodiment, it is assumed that the second output operation is an operation that displays predetermined information on the display device 226, for example. This operation may be rephrased as changing the display content of the display device 226. In this case, the second processing that is performed by the second processing unit 534 includes processing for changing the display content of the display device 226. That is to say, if the second processing unit 534 performs such second processing, the transmitting unit 54 is caused to transmit an information output instruction. The information output instruction is typically transmitted to the terminal apparatus 200 corresponding to the dish collecting apparatus 10, that is, the terminal apparatus 200 corresponding to the seat. Upon receiving the information output instruction, the terminal apparatus 200 accordingly displays predetermined information on the display device 226. For example, information for transmitting an information output instruction may be transmitted in association with an identifier for identifying the seat or an identifier for identifying the dish collecting apparatus 10 corresponding thereto may be transmitted from the transmitting unit 54 to the information processing apparatus 100. In this case, the information processing apparatus 100 may transmit the information output instruction to the display device 226 corresponding to the identifier.

The first processing unit 533 may be configured to perform the first processing in the case in which the determination processing unit 530 determines that the first-type dish 80 has passed through the collecting slot 19, regardless of the number counted by the first counting unit 531. The second processing unit 534 may be configured to perform the second processing in the case in which the determination processing unit 530 determines that the second-type dish 90 has passed through the collecting slot 19, regardless of the number counted by the second counting unit 532. In this case, the first counting unit 531 and the second counting unit 532 may not be provided, and the processing conditions may not be stored in the storage unit 51. In this case, information corresponding to a fact that the first-type dish 80 has passed through the collecting slot 19 or information corresponding to a fact that the second-type dish 90 has passed through the collecting slot 19 (i.e., information indicating a determination result of the determination processing unit 530) may be transmitted to the information processing apparatus 100 or the terminal apparatus 200 as the first processing or the second processing. Such an operation may be expressed as that the processing unit 53 transmits a determination result of the determination processing unit 530, that is, a determination result of the determining part to an external information processing apparatus (which may be the information processing apparatus 100 or the terminal apparatus 200). Such processing may be expressed as that, every time the number counted by the first counting unit 531 or the second counting unit 532 reaches one, the first processing unit 533 or the second processing unit 534 accordingly performs processing for transmitting information indicating the count number. It is also possible that, every time the number reaches a predetermined number of two or more, the first processing unit 533 or the second processing unit 534 accordingly performs processing for transmitting information indicating the count number.

In the case in which a determination result of the determination processing unit 530 is transmitted to the information processing apparatus 100 or the terminal apparatus 200 in this manner, the processing unit 53 is preferably configured to transmit the determination result of the determination processing unit 530 in association with an identifier for identifying the dish collecting apparatus 10, that is, an identifier for identifying the collecting slot 19 through which the first-type dish 80 or the second-type dish 90 has passed. Accordingly, the apparatus that receives the information can identify which dish collecting apparatus 10 the information relates to.

For example, a determination result of the determination processing unit 530 or information indicating the count number is transmitted to the information processing apparatus 100 or the like, the server processing unit 103 of the information processing apparatus 100 may count the number of first-type dishes 80 that have passed through the collecting slot 19 or the number of second-type dishes 90 that have passed through the collecting slot 19, based on the information transmitted from the dish collecting apparatus 10. In this case, it is also possible that this sort of processing condition is contained in the reward condition, and the information processing apparatus 100 is configured to determine whether or not the counted number satisfies the reward condition, and perform the reward processing in the case in which the reward condition is satisfied.

Furthermore, billing processing according to the counted count number may be performed as the first processing or the second processing that is performed by the processing unit 53 or the processing that is performed by the information processing apparatus 100 or the like as described above. In addition, various types of processing may be performed as the first processing or the second processing that is performed using a determination result of the determination processing unit 530 or the processing that is performed by the information processing apparatus 100 or the like.

Next, a hardware configuration example of the dish collecting apparatus 10 will be described.

Figure 5:
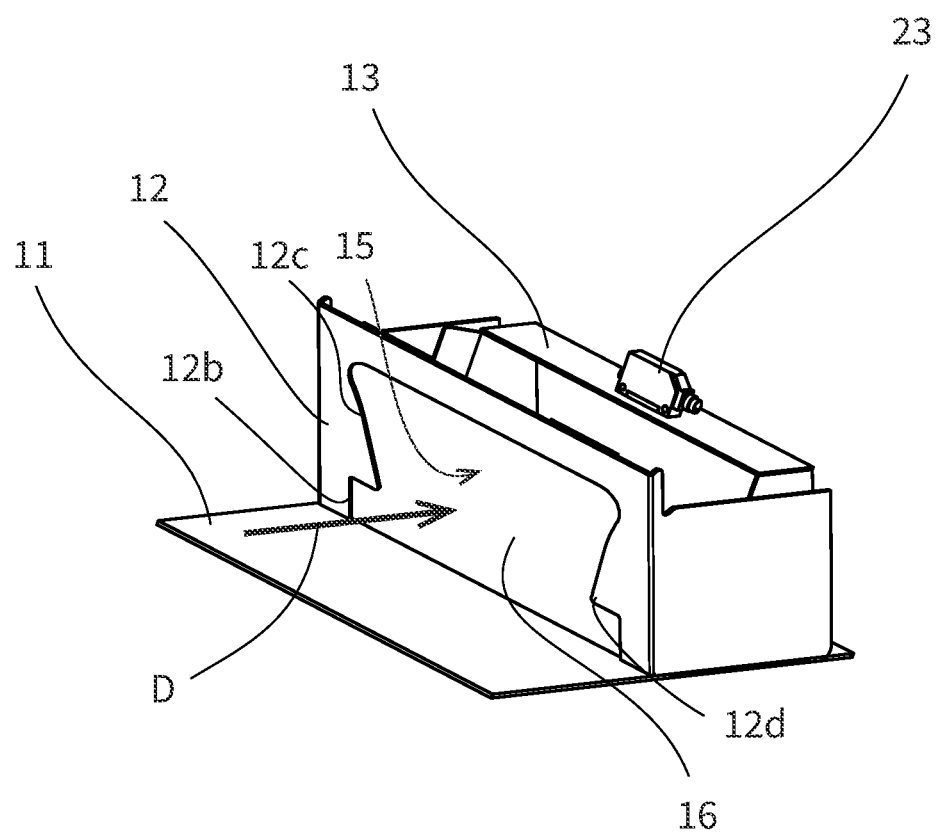
FIG. 5 is a perspective view of a dish collecting apparatus in the embodiment.
Figure 6:
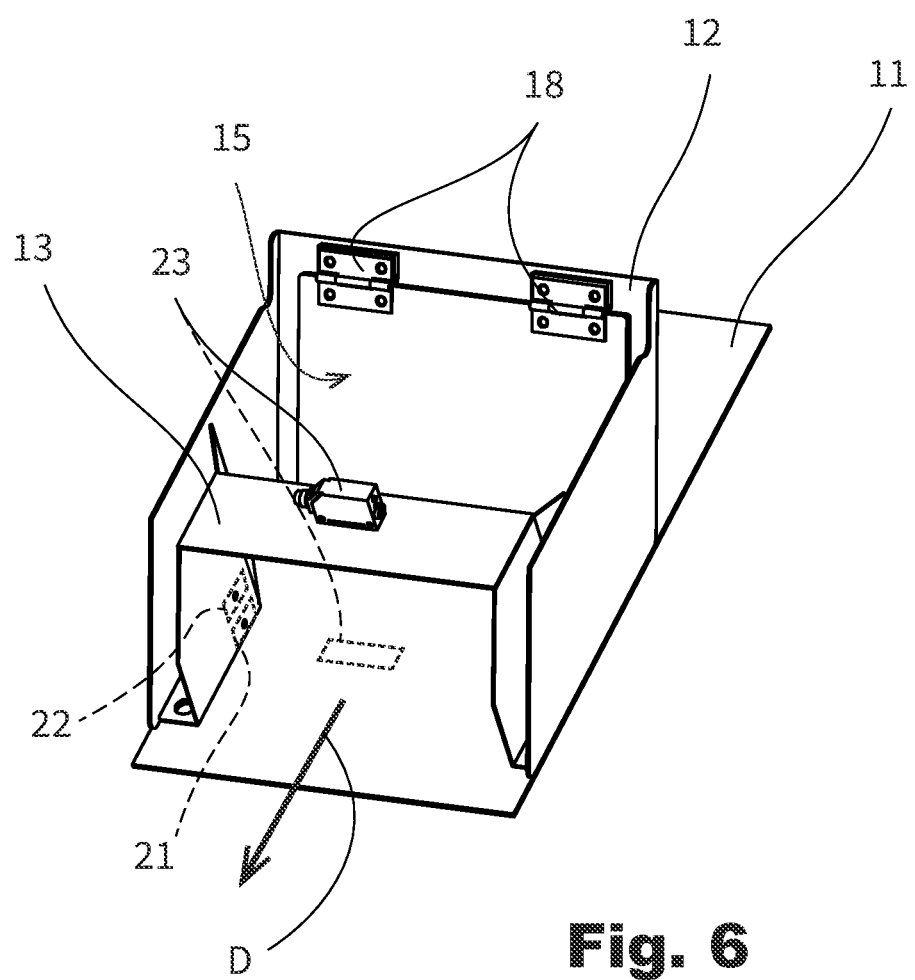
FIG. 6 is a second perspective view of the dish collecting apparatus in the embodiment.
Figure 7:
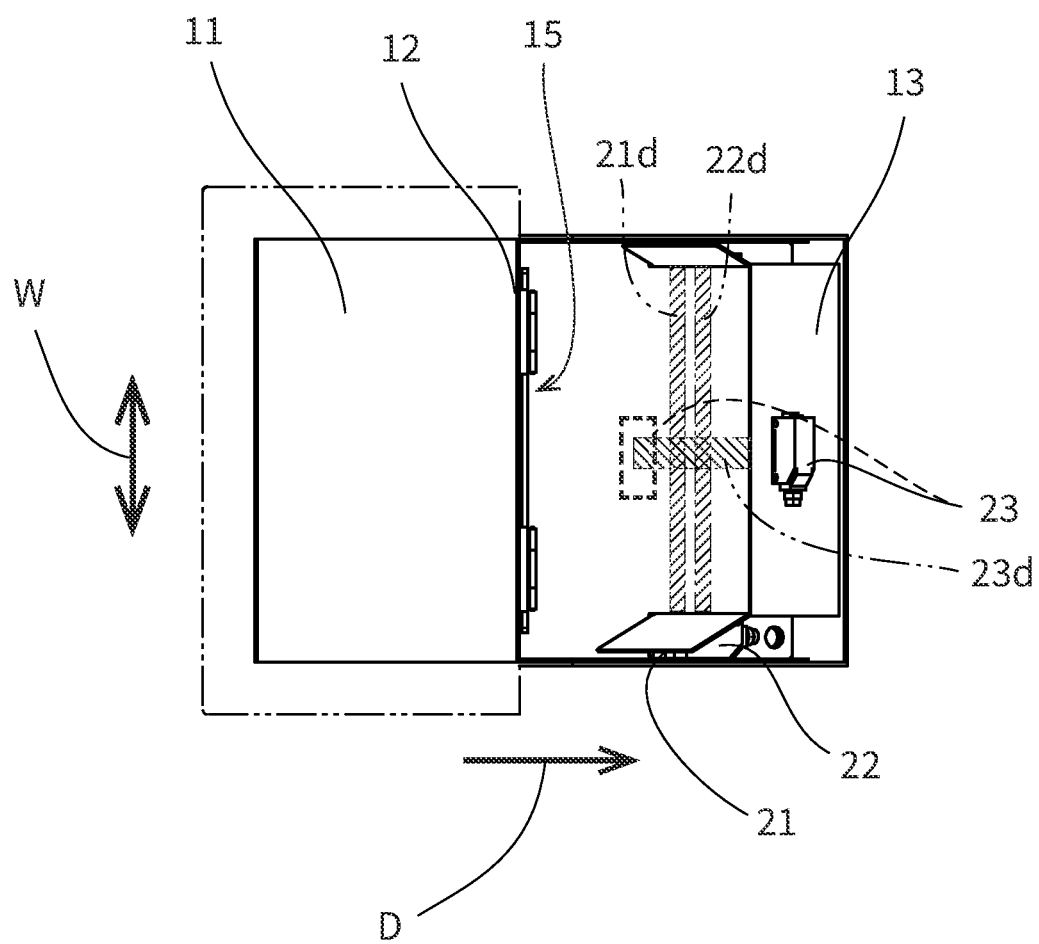
FIG. 7 is a plan view of the dish collecting apparatus in the embodiment.
Figure 8:
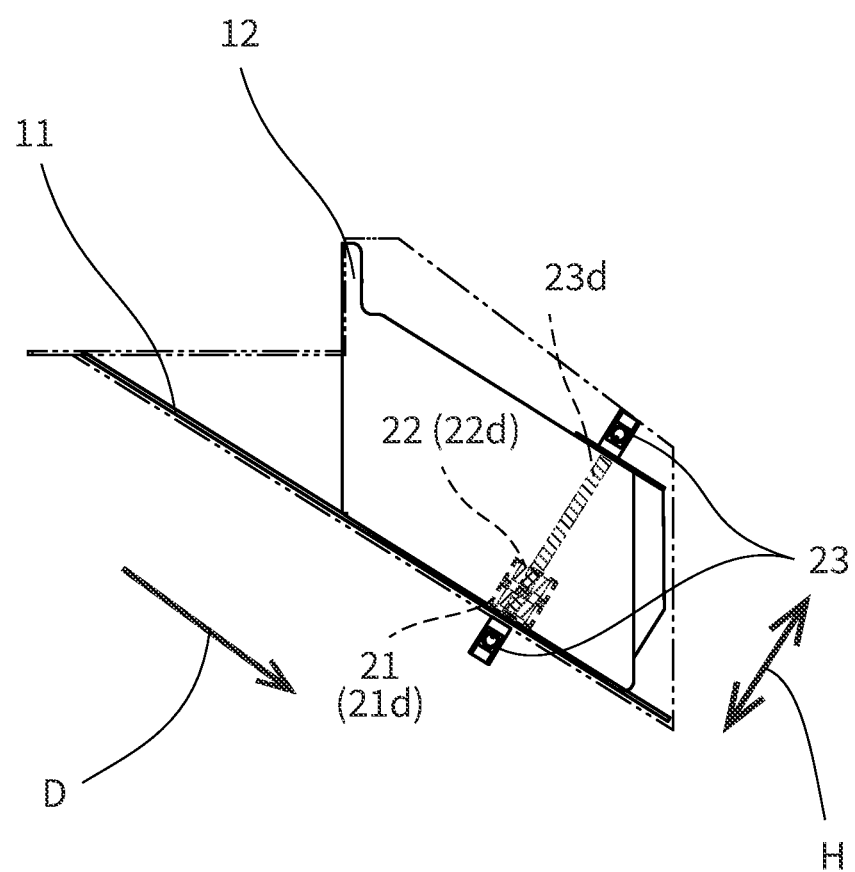
FIG. 8 is a side view of the dish collecting apparatus in the embodiment.

FIG. 5 is a perspective view of the dish collecting apparatus 10. FIG. 6 is a second perspective view of the dish collecting apparatus 10. FIG. 7 is a plan view of the dish collecting apparatus 10. FIG. 8 is a side view of the dish collecting apparatus 10.

In the drawings, the arrow D indicates an introduction direction D. The arrow W indicates a width direction. The width direction is a direction that is substantially perpendicular to the introduction direction D when viewed from above. The arrow H indicates a height direction. The height direction is a direction that is substantially perpendicular to the introduction direction D when viewed from a side. The height direction may be said to be a direction that is substantially perpendicular to the width direction. In this embodiment, the position in the height direction may be said to be the distance from a guide face 11 of the introduction passage that guides a dish to the dish collecting portion 75.

In the drawings described below, the storage unit 51, the processing unit 53, the transmitting unit 54, the receiving unit 55, and the like constituting the dish collecting apparatus 10 as described above are not shown. These units may be mounted on a circuit board or the like and housed in a housing to be placed in an appropriate location, for example. Also, the communication lines of the sensors 21, 22, and 23 and the like are not shown.

The dish collecting apparatus 10 includes the guide face 11, an open frame 12, a detection frame 13, a cover member 15, a hinge member 18, and the like. The guide face 11, the open frame 12, the detection frame 13, and the cover member 15 are molded from a metal plate or the like, for example, but the material thereof is not limited to this. These members may be thicker than the plate.

The guide face 11 forms the bottom face of the introduction passage leading from the collecting slot 19 to the dish collecting portion 75. The guide face 11 is arranged to be inclined downward from the upper face of the table 5 toward the dish collecting portion 75. In other words, the guide face 11 is inclined downward along the introduction direction D. The guide face 11 is in the shape of a flat surface, for example, but there is no limitation to this. The first-type dishes 80, the second-type dishes 90, and the third-type dishes 95 put into the collecting slot 19 are each slidingly moved by gravity along the guide face 11 in the introduction direction D and guided to the dish collecting portion 75.

The two ends in the width direction of the guide face 11 are provided with side walls extending upward. The side walls and the guide face 11 form an introduction passage surrounded on three sides.

The open frame 12 is provided upright on the guide face 11 so as to face the collecting slot 19. The open frame 12 has an opening through which dishes put into the collecting slot 19 pass. The open frame 12 can be said to be a first gate through which dishes pass on the introduction passage.

As shown in FIG. 5, the opening of the open frame 12 includes an opening lower portion 12b, an opening upper portion 12c, and a neck portion 12d. The opening lower portion 12b is a portion of the opening that is close to the guide face 11. The opening upper portion 12c is a portion of the opening that is at a distance from the guide face 11 and above the opening lower portion 12b. The neck portion 12d is located between the opening lower portion 12b and the opening upper portion 12c in the height direction.

The detection frame 13 is located at a more distance from the collecting slot 19 than the open frame 12 is in the introduction direction D. The detection frame 13, together with a portion of the guide face 11, forms a ring-like portion (not limited to a circular ring-like portion) through which dishes pass. That is to say, the detection frame 13 includes portions that are located at the two ends in the width direction and an upper portion that connects the upper ends of these portions. The detection frame 13 can be said to be a second gate through which dishes pass on the introduction passage.

The cover member 15 is a member in the shape of a flat plate that is provided on the face of the open frame 12 on the side closer to the dish collecting portion 75. The cover member 15 can rotate with respect to the open frame 12 via the hinge member 18 provided at the upper end. The cover member 15 is in a closed posture to block the opening of the open frame 12 due to gravity. When a dish is put into the collecting slot 19, the dish touches the surface of the cover member 15 on the side closer to the collecting slot 19, and thus the cover member 15 is pushed into the introduction direction D. Accordingly, the cover member 15 rotates with respect to the open frame 12 to be in an open state, and the dish enters the introduction passage from the collecting slot 19 via the opening of the open frame 12. After the dish passes through the open frame 12, the cover member 15 is rotated by gravity to be in a closed state.

In this embodiment, the surface of the cover member 15 on the side closer to the collecting slot 19 is provided with a rubber sheet 16. This reduces the loudness of the sound and the magnitude of the impact generated when the dishes come into contact with the cover member 15. This also reduces the loudness of the sound and the magnitude of the impact generated by contact between the cover member 15 and the open frame 12 when the cover member 15 changes from the open state to the closed state. The rubber sheet 16 may not be provided, or may be provided only at portions that may come into contact with the dishes or the open frame 12.

In this embodiment, the three sensors 21, 22, and 23 may be arranged on portions around the introduction passage as follows such that their output signals change according to the type of dishes that pass through the introduction passage.

In this embodiment, the sensors 21, 22, and 23 are photoelectric sensors, for example. The sensors 21, 22, and 23 are each constituted by a sensor body and a reflector placed on the opposite side of the sensor body across the introduction passage, or a light emitting part and a light receiving part disposed on the opposite side of the light emitting part across the introduction passage, for example, but there is no limitation to this. In FIGS. 7 and 8, detection ranges 21d, 22d, and 23d of the sensors 21, 22, and 23 are schematically shown with hatching.

The three sensors 21, 22, and 23 are located at substantially the same position in the introduction direction D, for example. In other words, the detection ranges 21d, 22d, and 23d are at substantially the same position in the introduction direction D. This makes it possible to obtain detection results of a dish at a predetermined position in the introduction direction D at the same point in time.

The first sensor 21 is located on the side portions of the detection frame 13 on the side closer to the guide face 11. The first detection range 21d of the first sensor 21 is substantially the entire area in the width direction on the side closer to the guide face 11, in the area surrounded by the detection frame 13.

The second sensor 22 is located on the side portions of the detection frame 13, on the side that is at a more distance from the guide face 11 than the first sensor 21 is. That is to say, the second sensor 22 is located above the first sensor 21 in the height direction. The second detection range 22$d$ of the second sensor 22 is substantially the entire area in the width direction, at a position that is slightly at a distance from the guide face 11, in the area surrounded by the detection frame 13. The second detection range 22$d$ is located so as to be slightly higher than the first detection range 21$d$ in the height direction.

The third sensor 23 is located on the upper portion of the detection frame 13, substantially at the center in the width direction of the introduction passage. The third detection range 23$d$ of the third sensor 23 is substantially the entire area in the height direction, at the center in the width direction, in the area surrounded by the detection frame 13.

In this manner, in this embodiment, the first detection range 21$d$ of the first sensor 21 and the second detection range 22$d$ of the second sensor 22 out of the three sensors 21, 22, and 23 can be said to be at different heights. Furthermore, the third detection range 23$d$ and the first detection range 21$d$ may be said to be at different heights, and the third detection range 23$d$ and the second detection range 22$d$ may be said to be at different heights.

Furthermore, the third detection range 23$d$ of the third sensor 23 and the first detection range 21$d$ of the first sensor 21 out of the three sensors 21, 22, and 23 can be said to be at different positions in the width direction. Furthermore, the third detection range 23$d$ of the third sensor 23 and the second detection range 22$d$ of the second sensor 22 can be said to be at different positions in the width direction.

Figure 9:
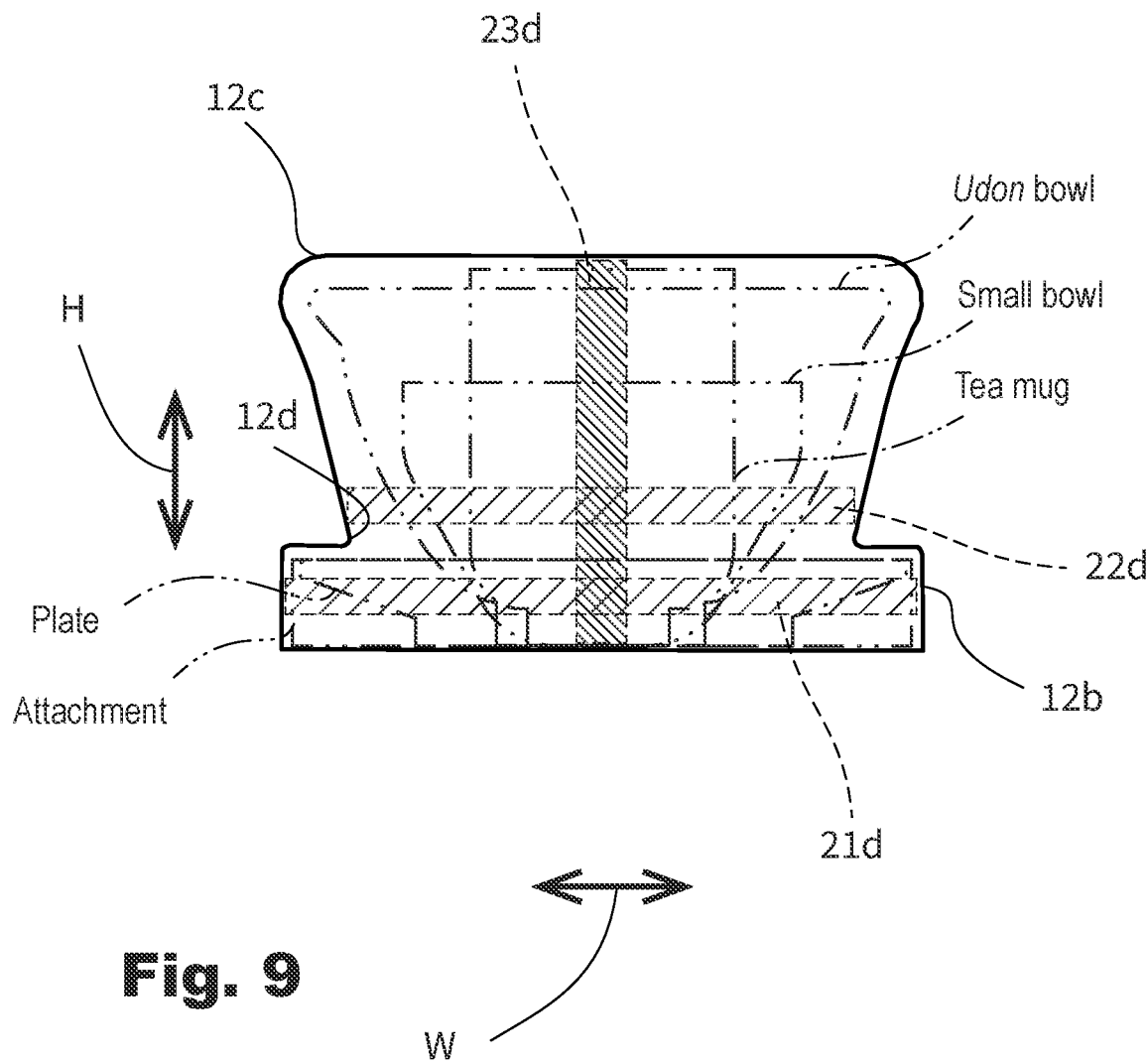
FIG. 9 is a view illustrating detection ranges of sensors of the dish collecting apparatus in the embodiment.

FIG. 9 is a view illustrating the detection ranges 21$d$, 22$d$, and 23$d$ of the sensors 21, 22, and 23 of the dish collecting apparatus 10.

FIG. 9 is a view of the opening of the open frame 12 as viewed in a direction along the introduction direction D. The dash-double-dotted lines indicate examples of the external shapes of dishes that can be put into the collecting slot 19. The detection ranges 21$d$, 22$d$, and 23$d$ of the sensors 21, 22, and 23 at the position where the detection frame 13 is provided are schematically shown with hatching.

As shown in FIG. 9, in this embodiment, the opening lower portion 12$b$ has a width that is slightly greater than the width of a plate that is the first-type dish 80 and an attachment that is the third-type dish 95. The opening upper portion 12$c$ is provided such that the opening has a height that is slightly greater than the height of a tea mug that is the second-type dish 90, and has a width that is slightly greater than the width of an udon bowl that is the second-type dish 90. The neck portion 12$d$ is a portion that is located slightly above the height of the plate and the attachment, and has a size in the width direction is smaller than the size in the width direction of the opening lower portion 12$b$.

The plate and the attachment put into the collecting slot 19 pass through the opening lower portion 12$b$ of the open frame 12. The second-type dishes 90 that are tea mugs, udon bowls, or small bowls put into the collecting slot 19 pass through the opening lower portion 12$b$ and the opening upper portion 12$c$ of the open frame 12. When the center position of each dish substantially matches the center in the width direction of the opening, the neck portion 12$d$ does not interfere with any of the dishes that are to be collected by the dish collecting apparatus 10. In other words, the position of each dish passing through the introduction passage is to some extent aligned with the center in the width direction when the dish passes through the open frame 12.

In this embodiment, the first detection range 21$d$ is set to overlap the opening lower portion 12$b$ in the height direction, for example. The second detection range 22$d$ is set to overlap the opening upper portion 12$c$ in the height direction, for example. The second detection range 22$d$ is located above the portion through which the first-type dishes 80 or the third-type dishes 95 pass. The second detection range 22$d$ is located above the neck portion 12$d$ with the smallest size in the width direction. The third detection range 23$d$ is located at the center in the width direction.

FIG. 10 is a table illustrating a method for determining a dish that passes in the dish collecting apparatus 10.

As shown in FIG. 10, in this embodiment, it is possible to determine the type of a dish that passes through the introduction passage, based on a combination of detection results of the sensors 21, 22, and 23. That is to say, it is possible to determine whether the type of a dish that passes through the introduction passage is the first-type dish 80, the second-type dish 90, or the third-type dish 95, based on a combination of detection results of the sensors 21, 22, and 23.

In the case in which a plate that is the first-type dish 80 has passed, there is a reaction from the first sensor 21 and the third sensor 23 (the sensors detect that an object has passed through the detection ranges). That is to say, the determination processing unit 530 determines that a plate that is the first-type dish 80 has passed in the case in which there is a reaction from the first sensor 21, there is no reaction from the second sensor 22, and there is a reaction from the third sensor 23. In this case, in the processing unit 53, the first counting unit 531 counts the first count number of the first-type dishes 80.

On the other hand, in the case in which a tea mug, a small bowl, an udon bowl, or the like that is the second-type dish 90 has passed, there is a reaction from all the sensors 21, 22, and 23. That is to say, the determination processing unit 530 determines that the second-type dish 90 has passed in the case in which there is a reaction from the first sensor 21, there is a reaction from the second sensor 22, and there is a reaction from the third sensor 23. In this case, in this embodiment, in the processing unit 53, the second counting unit 532 counts the second count number of the second-type dishes 90. It is also possible to determine whether or not the second-type dish 90 has passed, only based on whether or not there is a reaction from the second sensor 22.

Furthermore, in the case in which a ring-like dish that is the third-type dish 95 pas passed, there is a reaction only from the first sensor 21. The determination processing unit 530 determines that an attachment that is the third-type dish 95 has passed in the case in which there is a reaction from the first sensor 21 (the sensor detects that an object has passed through the detection range) and there is no reaction from the second sensor 22 and the third sensor 23. In this case, in this embodiment, in the processing unit 53 increments the second count number of the second-type dishes 90 (second-type dish count). That is to say, in either case in which the processing unit 53 determines that the second-type dish 90 has passed and determines that the third-type dish 95 has passed, the second counting unit 532 performs counting. It may be understood that an attachment is included in the second-type dish 90 and the second counting unit 532 performs counting in the case in which the second-type dish 90 has passed. The configuration is not limited to this, and the processing unit 53 may perform some other processing (any processing such as counting or outputting information) corresponding to the passage of the third-type dish 95. It is also possible that the processing unit 53 does not perform any processing in the case in which the third-type dish 95 has passed.

Figure 11:
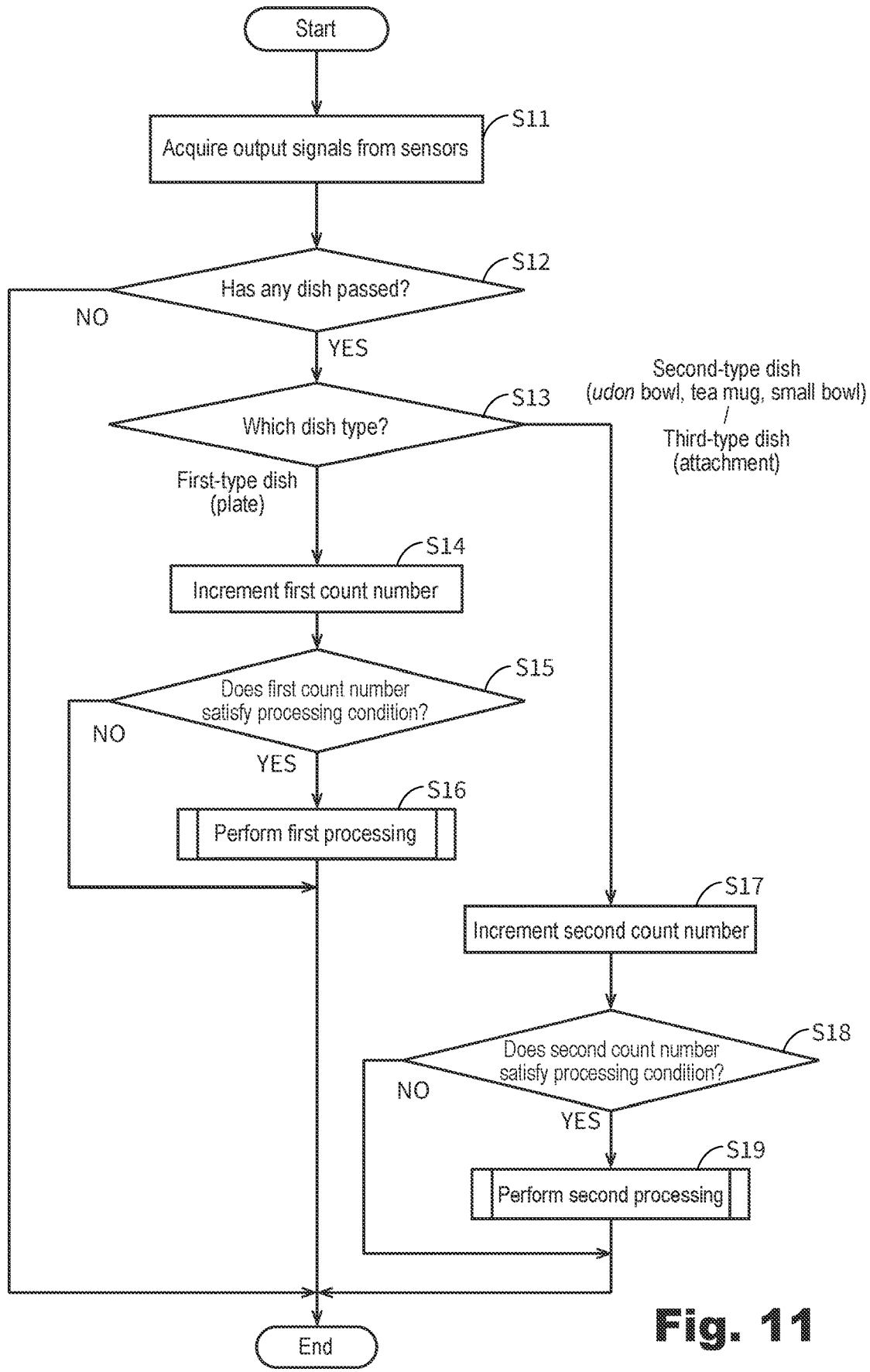
FIG. 11 is a flowchart illustrating an example of an operation of a processing unit of the dish collecting apparatus in the embodiment.

FIG. 11 is a flowchart illustrating an example of an operation of the processing unit 53 of the dish collecting apparatus 10.

The operation shown in FIG. 11 is repeated at all times, for example. Such an operation may be performed within a predetermined period of time. The predetermined period of time may be from when a customer group arrives at the store to when they pay their bill, or may be set in relation to the store's operating hours, for example. It is also possible that each dish collecting apparatus 10 causes a sensor or the like to detect that the cover member 15 changes from the closed state to the open state, and performs an operation during a predetermined period of time corresponding to the detection time.

(Step S11) The processing unit 53 acquires output signals from the sensors 21, 22, and 23.

(Step S12) The processing unit 53 determines whether or not any dish has passed through the introduction passage based on the acquired output signals. For example, it may be determined that any dish has passed in the case in which there is a reaction from any one of the sensors 21, 22, and 23. The determination method is not limited to this. If it is determined that a dish has passed through the introduction passage, the procedure advances to step S13. Otherwise, the processing is ended. The ending the processing in the example shown in FIG. 11 can be said to be advancing the procedure to step S11.

(Step S13) The processing unit 53 determines the dish type based on the acquired output signals. If it is determined that the first-type dish 80 has passed, the procedure advances to step S14. If it is determined that the second-type dish 90 has passed, the procedure advances to step S17. If it is determined that the third-type dish 95 has passed, the procedure advances to step S17.

(Step S14) The first counting unit 531 increments the count value (first count number).

(Step S15) The processing unit 53 determines whether or not the first count number counted by the first counting unit 531 satisfies the processing condition. If it is determined that the first count number satisfies the processing condition, the procedure advances to step S16. Otherwise, the processing is ended.

(Step S16) The first processing unit 533 performs the first processing. Subsequently, the processing is ended.

(Step S17) The second counting unit 532 increments the count value (second count number).

(Step S18) The processing unit 53 determines whether or not the second count number counted by the second counting unit 532 satisfies the processing condition. If it is determined that the second count number satisfies the processing condition, the procedure advances to step S19. Otherwise, the processing is ended.

(Step S19) The second processing unit 534 performs the second processing. Subsequently, the processing is ended.

As explained above, according to this embodiment, the dish collecting apparatus 10 can determine whether a dish that passes through the collecting slot 19 is the first-type dish 80, the second-type dish 90, or the third-type dish 95. Accordingly, it is possible to perform predetermined processing according to a determination result of a dish that has passed through the collecting slot 19. It is possible to cause the store system 1000 to perform operations in different modes, according to whether a dish that has passed through the collecting slot 19 is the first-type dish 80 or the second-type dish 90, or the number of first-type dishes 80 or second-type dishes 90. Accordingly, it is possible to motivate a customer group to put not only the first-type dishes 80 but also the second-type dishes 90 into the collecting slot 19, which reduces the workload of cleanup work or the like that is required at the store after the customer group has finished their meal. The use of the dish collecting apparatus 10 makes it possible to perform the operation associated with putting of the first-type dish 80 into the collecting slot 19 and the operation associated with putting of the second-type dish 90 into the collecting slot 19 in different modes, thereby providing a variety of customer experiences to the customer group. Specifically, for example, it is possible to perform reward processing, billing processing, and the like in association with putting of the first-type dish 80 into the collecting slot 19, and to issue a coupon, to change the display content of the display device 226, and the like in association with putting of the second-type dish 90 into the collecting slot 19.

The processing in this embodiment may be realized by software. The software may be distributed by software downloads or the like. Furthermore, the software may be distributed in a form where the software is stored in a recording medium such as a CD-ROM. The software that realizes the dish collecting apparatus 10 in this embodiment is the following sort of program. Specifically, this program is a program executable by a computer of the dish collecting apparatus 10, for causing the computer of the dish collecting apparatus 10 to function as: a determination processing unit that determines whether a first-type dish has passed through a collecting slot or a second-type dish whose shape is different from that of the first-type dish has passed through the collecting slot, based on detection results of at least two sensors configured to detect an object that passes through a predetermined detection range in the collecting slot; and a processing unit that performs predetermined processing according to a determination result of the determining part.

In the foregoing embodiment, the type or the detection ranges of the two or more sensors may be changed. In this case, it is possible to operate the sensors as described above, by appropriately setting the corresponding relationship between a combination of detection results of the sensors and a determination result of the dish.

Figure 12:
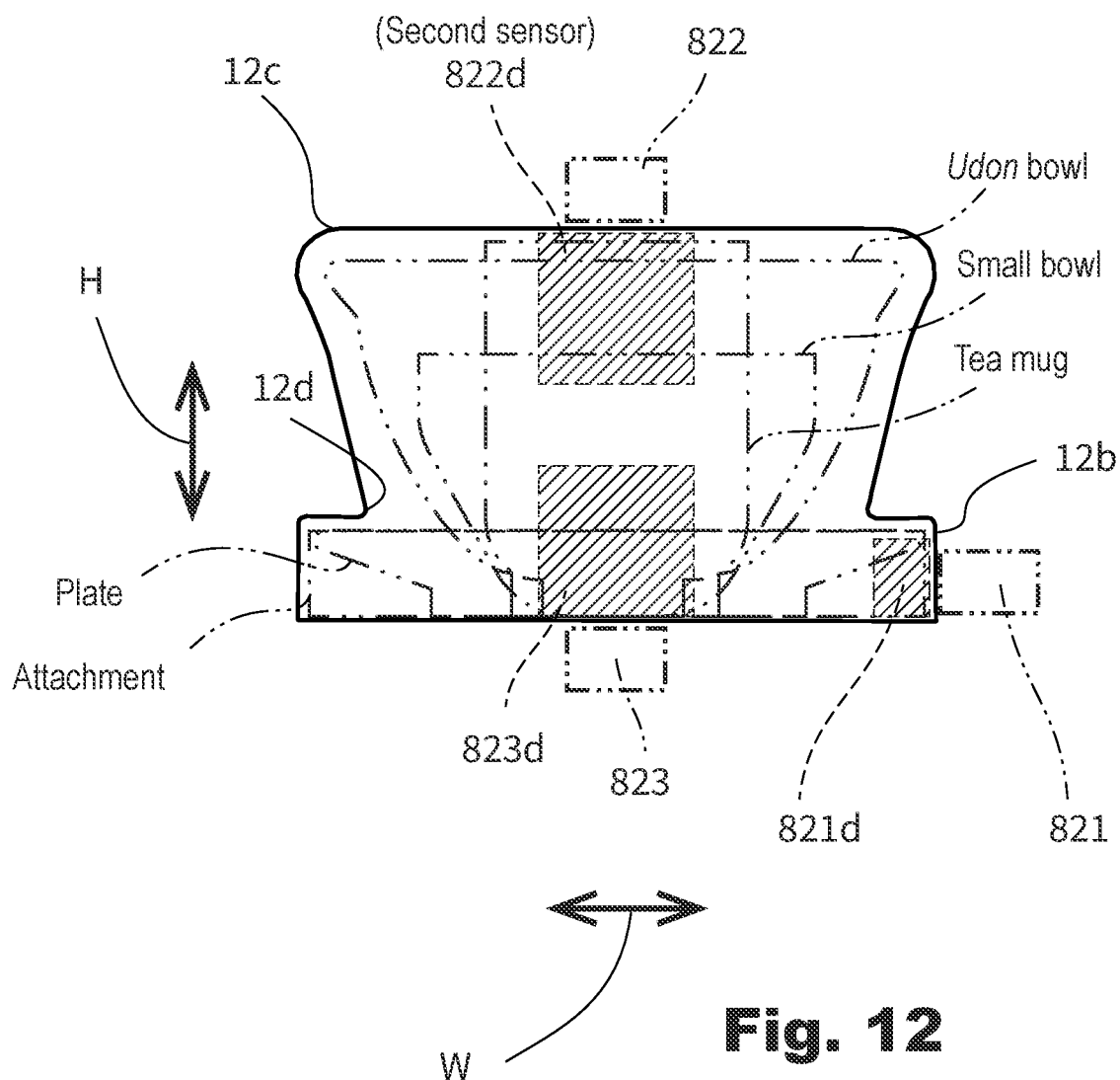
FIG. 12 is a view illustrating detection ranges of sensors of the dish collecting apparatus according to a modified example of the embodiment.

FIG. 12 is a view illustrating detection ranges 821*d*, 822*d*, and 823*d* of sensors 821, 822, and 823 of the dish collecting apparatus 10 according to a modified example of this embodiment.

FIG. 12 is a view of the opening of the open frame 12 as viewed in a direction along the introduction direction D as in FIG. 9. In this modified example, for example, sensors such as capacitive proximity sensors whose detection ranges are limited to areas close to the sensors 821, 822, and 823 are used as the sensors 821, 822, and 823. The first sensor 821 is located at one side of the opening lower portion 12*b* in the width direction. The second sensor 822 is located on the upper side of the opening of the open frame 12, substantially at the center in the width direction. The third sensor 823 is located on the lower side of the opening of the open frame 12, substantially at the center in the width direction. The sensors 821 and 822 may be arranged on the detection frame 13. The third sensor 823 may be arranged on the lower side of the guide face 11. The second sensor 822 and the third sensor 823 may be arranged to face each other in the height direction.

That is to say, in this modified example, the first detection range 821*d* is set to the area around one end in the width direction of the opening lower portion 12*b*, for example. This first detection range 821*d* is preferably located so as not to be closer to the center in the width direction than the neck portion 12*d* is, for example. This prevents the first sensor 821 from reacting with the passage of the second-type dish 90 and the like whose height is greater than the height of the neck portion 12*d*. The second detection range 822*d* is located on the upper portion of the opening upper portion 12*c*, at the center in the width direction thereof, for example. The third detection range 823*d* is located on the area including the opening lower portion 12*b*, that is, the lower portion of the opening, at the center in the width direction thereof.

FIG. 13 is a table illustrating a method for determining a dish that passes in the dish collecting apparatus 10 according to the modified example.

FIG. 13 is similar to FIG. 10. In this modified example as well, it is possible to determine the type of a dish that passes through the introduction passage, based on a combination of detection results of the sensors 821, 822, and 823.

In the case in which a dish that is the first-type dish 80 has passed, there is a reaction from the first sensor 821 and the third sensor 823. In this case, in the processing unit 53, the first counting unit 531 counts the number of first-type dishes 80 (counts the number of plates).

In the case in which the second-type dish 90 has passed, there is no reaction from the first sensor 821, and there is a reaction from the second sensor 822 and the third sensor 823. In this case, in this modified example, the determination processing unit 530 determines that a dish that is not a plate has passed. The processing in this case may be performed as appropriate. That is to say, the processing unit 53 may or may not count the number of second-type dishes 90. It is also possible to determine whether or not the second-type dish 90 has passed, only based on whether or not there is a reaction from the second sensor 822.

In the case in which the third-type dish 95 has passed, there is a reaction from the first sensor 821, but there is no reaction from the other sensors 822 and 823. In this case, in this modified example, the determination processing unit 530 determines that a dish that is not a plate has passed. The processing in this case may also be performed as appropriate. That is to say, the processing unit 53 may increment the second count number, or may not perform the counting. It is also possible that the determination processing unit 530 determines that an attachment that is the third-type dish 95 has passed, and processing different from that in the case in which the first-type dishes 80 or the second-type dish 90 has passed. In the case in which it is determined that the third-type dish 95 has passed, the processing unit 53 may not perform any special processing.

Others

Figure 14:
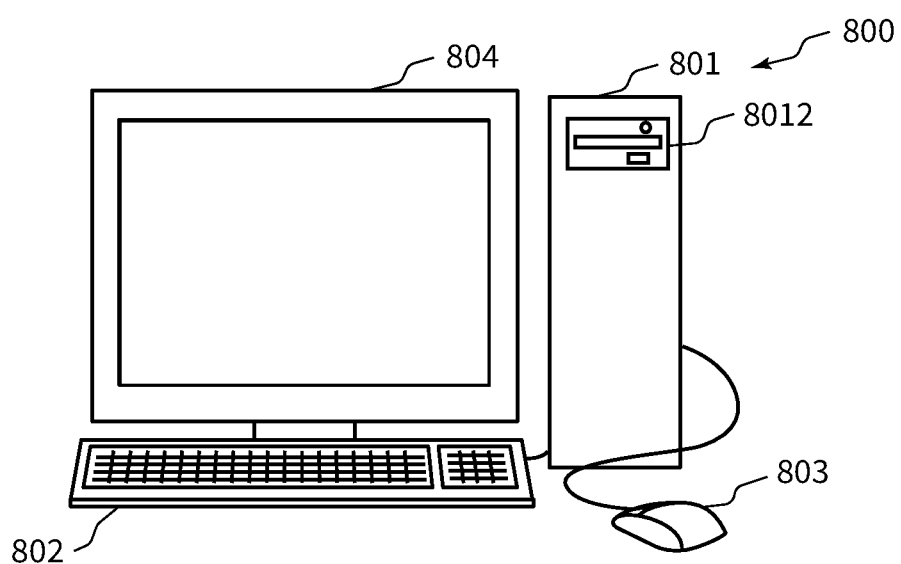
FIG. 14 is a schematic view of a computer system in the embodiment.
Figure 15:
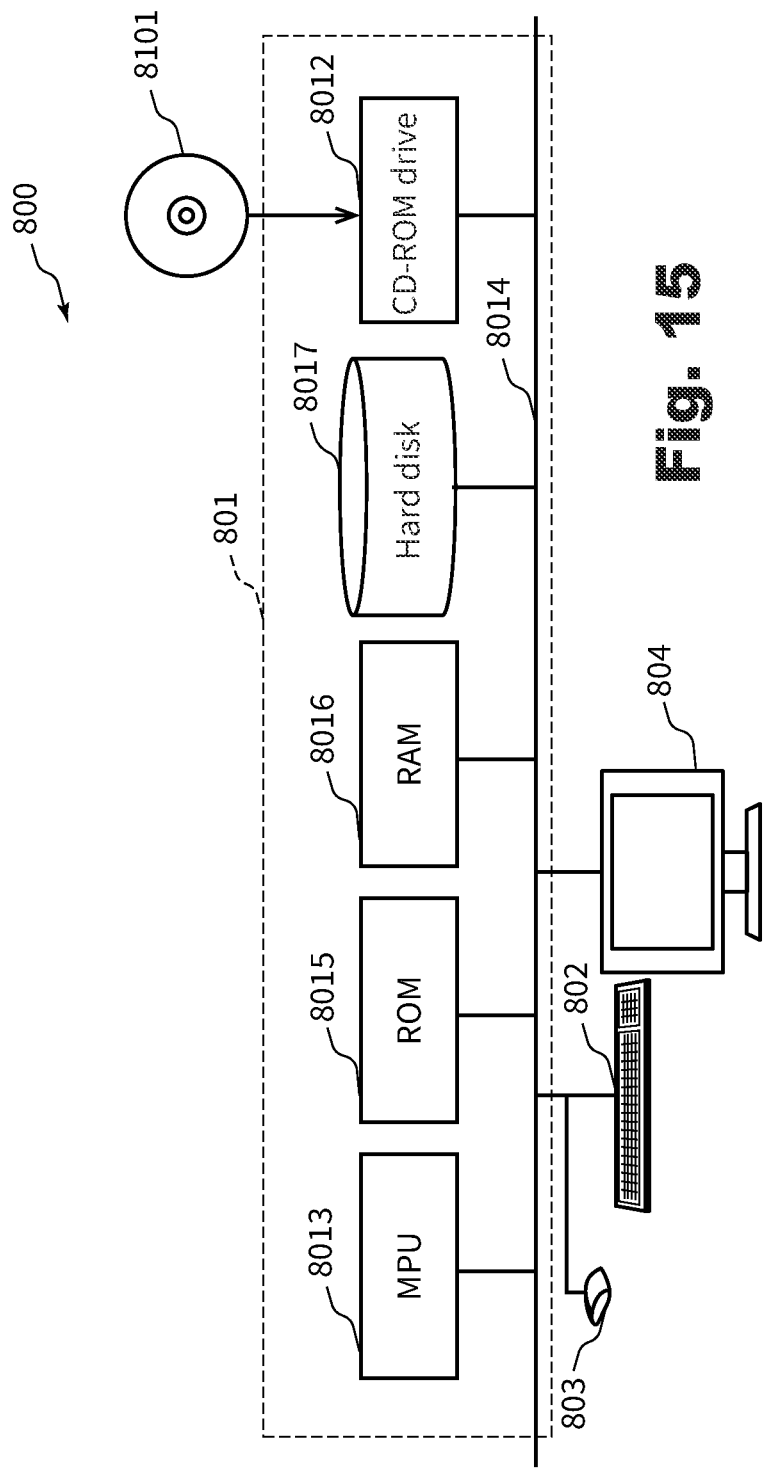
FIG. 15 is a block diagram of the computer system in the embodiment.

FIG. 14 is a schematic view of a computer system 800 in the foregoing embodiment. FIG. 15 is a block diagram of the computer system 800 in the foregoing embodiment.

These drawings show the configuration of a computer that executes the program described in this specification to realize the dish collecting apparatus and the like in the foregoing embodiment. The foregoing embodiment can be realized using computer hardware and a computer program executed thereon.

The computer system 800 includes a computer 801 including a CD-ROM drive, a keyboard 802, a mouse 803, and a monitor 804.

The computer 801 includes, in addition to the CD-ROM drive 8012, an MPU 8013, a bus 8014 connected to the CD-ROM drive 8012 and the like, a ROM 8015 in which a program such as a boot up program is stored, a RAM 8016 that is connected to the MPU 8013 and is a memory in which a command of an application program is temporarily stored and a temporary storage area is provided, and a hard disk 8017 in which an application program, a system program, and data are stored. Although not shown, the computer 801 may further include a network card that provides connection to a LAN.

The program for causing the computer system 800 to execute the functions of the dish collecting apparatus and the like in the foregoing embodiment may be stored in a CD-ROM 8101 that is inserted into the CD-ROM drive 8012, and be transmitted to the hard disk 8017. Alternatively, the program may be transmitted via a network (not shown) to the computer 801 and stored in the hard disk 8017. At the time of execution, the program is loaded into the RAM 8016. The program may be loaded from the CD-ROM 8101, or directly from a network.

The program does not necessarily have to include, for example, an operating system (OS) or a third party program to cause the computer 801 to execute the functions of the dish collecting apparatus and the like in the foregoing embodiment. The program may only include a command portion to call an appropriate function (module) in a controlled mode and obtain desired results. The manner in which the computer system 800 operates is well known, and thus a detailed description thereof has been omitted.

It should be noted that, in the program, in a transmitting step of transmitting information, a receiving step of receiving information, or the like, processing that is performed by hardware, for example, processing performed by a modem or an interface card in the transmitting step (processing that can be performed only by hardware) is not included.

Furthermore, the computer that executes this program may be a single computer, or may be multiple computers. That is to say, centralized processing may be performed, or distributed processing may be performed.

Furthermore, in the foregoing embodiment, it will be appreciated that two or more constituent elements in one apparatus may be physically realized by one medium.

In the foregoing embodiment, each process may be realized as centralized processing using a single apparatus (system), or may be realized as distributed processing using multiple apparatuses. In this case, the entire system constituted by multiple apparatuses that perform distributed processing may be regarded as one "apparatus".

For example, the processes and configurations that the dish collecting apparatuses, the information processing apparatus, the terminal apparatuses, and the like are supposed to perform or have in the foregoing embodiment may be modified to be performed in other apparatuses as appropriate.

Furthermore, in the foregoing embodiment, information transmission performed between constituent elements may be such that, for example, if two constituent elements for transmitting information are physically different from each other, the transmission is performed by one of the constituent elements outputting the information and the other constituent element accepting the information, or alternatively, if two constituent elements for transmitting information are physically the same, the transmission is performed by shifting from a processing phase corresponding to one of the constituent elements to a processing phase corresponding to the other constituent element.

Furthermore, in the foregoing embodiment, information related to the processing that is performed by each constituent element, for example, information that is to be accepted, acquired, selected, generated, transmitted, or received by each constituent element, information such as a threshold value, a numerical expression, or an address used by each constituent element in the processing and the like may be retained in an unshown recording medium temporarily or for a long period of time even if not specified in the description above. Furthermore, the information may be accumulated in the unshown recording medium by each constituent element or by an unshown accumulating unit. Furthermore, the information may be read from the unshown recording medium by each constituent element or by an unshown reading unit.

Furthermore, in the foregoing embodiment, if information used by each constituent element or the like, for example, information such as a threshold value, an address, or various setting values used by each constituent element in the processing may be changed by a user, the user may be or may not be allowed to change such information as appropriate even if not specified in the description above. If the user is allowed to change such information, the change may be realized by, for example, an unshown accepting unit that accepts a change instruction from the user and an unshown changing unit that changes information according to the change instruction. The unshown accepting unit may accept the change instruction, for example, by accepting information from an input device, by receiving information transmitted via a communication line, or by accepting information read from a predetermined recording medium.

The outputting information is a concept that encompasses display on a display screen, projection using a projector, printing by a printer, output of a sound, transmission to an external apparatus, accumulation in a recording medium, delivery of a processing result to another processing apparatus or another program, and the like. Specifically, it encompasses, for example, enabling the display of information on a web page, transmitting the information as e-mail or the like, and outputting the information for printing.

The accepting information is a concept that encompasses accepting information input via an input device such as a keyboard, a mouse, or a touch panel, receiving information transmitted via a wired or wireless communication line from another apparatus or the like, and accepting information read from a recording medium such as an optical disk, a magnetic disk, or a semiconductor memory.

In the foregoing embodiment, the determining part that determines whether the first-type dish has passed through the collecting slot or the second-type dish has passed through the collecting slot is constituted by multiple sensors, but the configuration of the determining part is not limited to this. For example, the determining part may be constituted by a camera that captures an image of an item that passes through the collecting slot, thereby acquiring a captured image, and an acquiring unit that acquires information on a dish that has passed through the collecting slot from the captured image. In this case, the camera may be configured to capture an image of a dish that is at the collecting slot, a dish that is on the introduction passage that introduces dishes from the collecting slot to the dish collecting portion, or a dish that comes out from the dish collecting portion side. Furthermore, the information on dishes may be acquired by the acquiring unit using a so-called machine learning technique. The machine learning technique may be used, for example, as follows. That is to say, a learning device in which a specific type of input information is taken as input and a type of output information that is to be acquired is taken as output is configured using a machine learning technique. For example, two or more pairs of input information and output information are prepared in advance, and a learning device is configured by giving the two or more pairs of information to a module for configuring a learning device of machine learning, and is accumulated in a storage unit. The learning device can also be said to be a classifier. There is no limitation on the machine learning technique, and examples thereof include deep learning, random forest, SVR, and the like. As the machine learning, for example, functions in various machine learning frameworks such as fastText, tinySVM, random forest, or TensorFlow, or various existing libraries may be used. The classifier is not limited to that obtained through machine learning, and, for example, a table indicating a corresponding relationship between an input vector based on input information or the like and output information may be used as the classifier. In this case, output information corresponding to a feature vector based on input information may be acquired from the table. Alternatively, a vector that is approximated to a feature vector based on input information may be generated using two or more input vectors in the table and parameters for weighting the input vectors and the like, and final output information may be acquired using output information and parameters corresponding to the input vectors used for the generation. Alternatively, the classifier may be a function or the like indicating a relationship between an input vector based on input information or the like and information for generating output information, for example. In this case, for example, information corresponding to a feature vector based on input information may be obtained using the function, and output information may be acquired using the obtained information.

The present invention is not limited to the embodiment set forth herein. Various modifications are possible within the scope of the invention.

INDUSTRIAL APPLICABILITY

As described above, the dish collecting apparatus according to the present invention has an effect that it is possible to determine multiple types of dishes with different shapes that pass through a collecting slot, and thus this apparatus is useful as a dish collecting apparatus and the like.

LIST OF REFERENCE NUMERALS

3 Seat unit
5 Table
7 Conveying apparatus
8 Upper unit
9 Prize output apparatus
10 Dish collecting apparatus
11 Guide face
12 Open frame
12*b* Opening lower portion
12*c* Opening upper portion
13 Detection frame
15 Cover member
16 Rubber sheet
18 Hinge member
19 Collecting slot
21, 821 First sensor 21d, 821d First detection range
22, 822 Second sensor
22d, 822d Second detection range
23, 823 Third sensor
23d, 823d Third detection range
51 Storage unit
53 Processing unit
54 Transmitting unit
55 Receiving unit
71 Conveyor
75 Dish collecting portion
80 First-type dish
90 Second-type dish
90b Multiple-plate set
95 Third-type dish
100 Information processing apparatus
101 Server storage unit
102 Server receiving unit
103 Server processing unit
104 Server transmitting unit
111 Reward condition storage unit
113 Order information storage unit
122 Order information receiving unit
134 Reward processing unit
200 Terminal apparatus
221 Terminal storage unit
222 Terminal accepting unit
223 Terminal processing unit
224 Terminal transmitting unit
225 Terminal receiving unit
226 Display device
231 Terminal configuring unit
511 Processing condition storage unit
530 Determination processing unit
531 First counting unit
532 Second counting unit
533 First processing unit
534 Second processing unit
1000 Store system

The invention claimed is:

1. A dish collecting apparatus for causing a dish that passes through a collecting slot to be collected in a dish collecting portion in a restaurant, comprising:
a determining part that determines whether a first-type dish has passed through the collecting slot or a second-type dish whose shape is different from that of the first-type dish has passed through the collecting slot; and
a processing unit that performs predetermined processing according to a determination result of the determining part,
wherein the determining part includes at least two sensors that each detect an object that passes through a predetermined detection range in the collecting slot, and
at least two sensors out of the sensors have detection ranges at different positions in at least one of a height direction or a width direction.

2. The dish collecting apparatus according to claim 1, wherein the determining part includes at least three sensors that each detect the object that passes through the predetermined detection range in the collecting slot, and determines whether the first-type dish has passed through the collecting slot or the second-type dish has passed through the collecting slot, based on a combination of detection results of at least three sensors out of the sensors.

3. The dish collecting apparatus according to claim 2, wherein the determining part determines whether the first-type dish has passed through the collecting slot, the second-type dish has passed through the collecting slot, or a third-type dish whose shape is different from those of the first-type dish and the second-type dish has passed through the collecting slot, based on a combination of detection results of the three sensors.

4. A dish collecting apparatus for causing a dish that passes through a collecting slot to be collected in a dish collecting portion in a restaurant, comprising:
a determining part that determines whether a first-type dish has passed through the collecting slot or a second-type dish whose shape is different from that of the first-type dish has passed through the collecting slot; and
a processing unit that performs predetermined processing according to a determination result of the determining part,
wherein the processing unit includes:
a first counting unit that, in a case in which the determining part determines that the first-type dish has passed through the collecting slot, counts the number of first-type dishes; and
a first processing unit that performs processing related to a predetermined output operation according to the number counted by the first counting unit.

5. The dish collecting apparatus according to claim 4, wherein the processing unit further includes a second processing unit that, in a case in which the determining part determines that the second-type dish has passed through the collecting slot, performs processing related to a predetermined output operation in a mode different from that of the first processing unit.

6. The dish collecting apparatus according to claim 5,
wherein the processing unit further includes a second counting unit that, in a case in which the determining part determines that the second-type dish has passed through the collecting slot, counts the number of second-type dishes, and
the second processing unit performs the processing related to the predetermined output operation according to the number counted by the second counting unit.

7. A dish collecting apparatus for causing a dish that passes through a collecting slot to be collected in a dish collecting portion in a restaurant, comprising:
a determining part that determines whether a first-type dish has passed through the collecting slot or a second-type dish whose shape is different from that of the first-type dish has passed through the collecting slot; and
a processing unit that performs predetermined processing according to a determination result of the determining part,
wherein the predetermined processing includes at least one of:
processing for outputting a prize from a prize output apparatus having a prize output function,
processing for changing display content of a display device having an information displaying function, or
processing for transmitting a determination result of the determining part, in association with an identifier for identifying a collecting slot through which the first-type dish or the second-type dish has passed, to an information processing apparatus that is communicable with the dish collecting apparatus.

* * * * *